(12) United States Patent
Jin et al.

(10) Patent No.: US 11,463,981 B2
(45) Date of Patent: Oct. 4, 2022

(54) LOCATION INFORMATION REPORTING METHOD AND APPARATUS

(71) Applicant: Huawei Technologies Co., Ltd., Shenzhen (CN)

(72) Inventors: Yinghao Jin, Shanghai (CN); Hongzhuo Zhang, Shanghai (CN); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 90 days.

(21) Appl. No.: 16/878,234

(22) Filed: May 19, 2020

(65) Prior Publication Data

US 2020/0288428 A1    Sep. 10, 2020

Related U.S. Application Data

(63) Continuation of application No. PCT/CN2018/116488, filed on Nov. 20, 2018.

(30) Foreign Application Priority Data

Nov. 20, 2017  (CN) .......................... 201711157255.9

(51) Int. Cl.
*H04W 36/32* (2009.01)
*H04W 64/00* (2009.01)
(Continued)

(52) U.S. Cl.
CPC ......... *H04W 64/003* (2013.01); *H04W 4/029* (2018.02); *H04W 8/14* (2013.01)

(58) Field of Classification Search
CPC ..... H04W 64/00; H04W 4/029; H04W 36/14; H04W 60/04; H04W 36/08;
(Continued)

(56) References Cited

U.S. PATENT DOCUMENTS

2011/0098048 A1* 4/2011 Zhang ................... H04W 64/00
455/438
2012/0039246 A1 2/2012 Zhang et al.
(Continued)

FOREIGN PATENT DOCUMENTS

CN    101594606 A    12/2009
CN    101653028    *    2/2010
(Continued)

OTHER PUBLICATIONS

Huawei et al.,"TS 23.501: Location report procedure for UE in RRC inactive mode", SA WG2 Meeting #122Bis, S2-176154, Aug. 21-25, 2017, Sophia Antipolis, France, 6 pages.
(Continued)

*Primary Examiner* — Quan M Hua
(74) *Attorney, Agent, or Firm* — Slater Matsil, LLP

(57) ABSTRACT

A location information reporting method includes: a first base station receives a first message from a core network device, where the first message includes first instruction information used to instruct to obtain location information of a terminal device, and the first base station and the core network device have a control plane connection established for the terminal device; and the first base station sends a second message to a second base station, where the second message includes second instruction information, the second instruction information is used to instruct to obtain the location information of the terminal device, and the second base station is configured to provide a service for the terminal device at a current moment.

20 Claims, 15 Drawing Sheets

(51) Int. Cl.
*H04W 4/029* (2018.01)
*H04W 8/14* (2009.01)

(58) Field of Classification Search
CPC ..... H04W 36/0022; H04W 4/02; H04W 8/08; H04W 76/30; H04W 36/0033; H04W 36/32; H04W 36/0077; H04W 76/27; H04W 76/11; H04W 36/0066; H04W 8/02; H04W 4/70; H04W 60/00; H04W 36/00; H04W 64/003; H04W 4/20; H04W 88/18; H04W 84/12; H04W 48/18; H04W 48/02; H04W 40/36; H04W 4/023; H04L 41/00; H04L 67/18; H04L 5/003
See application file for complete search history.

(56) References Cited

U.S. PATENT DOCUMENTS

| | | | | |
|---|---|---|---|---|
| 2016/0192283 | A1* | 6/2016 | Kwak | H04W 48/16 455/434 |
| 2018/0199160 | A1* | 7/2018 | Edge | H04W 4/02 |
| 2018/0279186 | A1* | 9/2018 | Park | H04W 36/30 |
| 2018/0368046 | A1* | 12/2018 | Zhang | H04W 36/38 |

FOREIGN PATENT DOCUMENTS

| | | |
|---|---|---|
| CN | 104581947 A | 4/2015 |
| CN | 105025465 A | 11/2015 |
| RU | 2541939 C2 | 2/2015 |
| WO | 2010124458 A1 | 11/2010 |
| WO | 2015161575 A1 | 10/2015 |
| WO | WO-2015161575 A1 * 10/2015 ............ H04W 64/00 |
| WO | 2019063086 A1 | 4/2019 |

OTHER PUBLICATIONS

Ericsson, "Mobility between LTE and NR for inactive UEs," 3GPP TSG-RAN WG2 #98, R2-1704126, Hangzhou, P.R. China, May 15-19, 2017, 6 pages.

Huawei et al, "TS 23.502: Location report procedure for UE in RRC inactive mode," SA WG2 Meeting #122Bis, S2-175849, Sophia Antipolis, France, Aug. 21-25, 2017, 3 pages.

3rd Generation Partnership Project; Technical Specification Group Radio Access Network; NG Radio Access Network (NG-RAN); Xn application protocol (XnAP) (Release 15), 3GPP TS 38.423 V0.4.0 (Oct. 2017), 63 pages.

CATT, "Periodic RNA update," 3GPP TSG-RAN WG3 #97, R3-172791, Berlin, Germany, Aug. 21-25, 2017, 3 pages.

NEC, "Location update at RAN-based notification area boundary," 3GPP TSG-RAN WG2 #97bis, R2-1703404, Spokane, WA, USA, Apr. 3-7, 2017, 5 pages.

Zte et al., "Consideration on DL Data Transmission in RRC_INACTIVE State," 3GPP TSG-RAN WG2 #97, R2-1701929, Athens, Greece, Feb. 13-17, 2017, 4 pages.

3rd Generation Partnership Project; Technical Specification Group Radio Access Network; NG Radio Access Network (NG-RAN); NG Application Protocol (NGAP) (Release 15), 3GPP TS 38.413 V0.4.0 (Oct. 2017), 88 pages.

* cited by examiner

LOCATION INFORMATION REPORTING METHOD AND APPARATUS

CROSS-REFERENCE TO RELATED APPLICATIONS

This application is a continuation of International Application No. PCT/CN2018/116488, filed on Nov. 20, 2018, which claims priority to Chinese Patent Application No. 201711157255.9, filed on Nov. 20, 2017. The disclosures of the aforementioned applications are hereby incorporated by reference in their entireties.

TECHNICAL FIELD

Embodiments of the present invention relate to the field of communications technologies, and in particular, to a location information reporting method and apparatus.

BACKGROUND

A radio resource control (RRC) inactive state (which may be briefly referred to as an inactive state below) is newly defined for a terminal device in 5G. In the inactive state, an access stratum (AS) context of the terminal device is reserved on both the terminal device side and a radio access network (RAN) side (the RAN includes at least a camping gNB). To be specific, when the terminal device switches from an RRC connected state to the inactive state or after the terminal device switches to the inactive state, the camping gNB may also transmit the context of the terminal device to another gNB in a RAN-based notification area (RNA) for storage. In addition, when the terminal device switches from the inactive state to the RRC connected state, the camping gNB does not need to reactivate a link between the RAN and a core network control plane network element (for example, an access and mobility management function (AMF)), for example, a next generation (NG) link 2.

In addition, the terminal device in the inactive state may move in the RNA. A network side may not be notified when the terminal device moves in the RNA. In this case, the core network control plane network element and the camping gNB may not know a base station that provides a service for the terminal device at a current moment. Therefore, a solution for how to report location information of the terminal device to the core network control plane network element when the core network control plane network element needs to obtain the location information of the terminal device is not provided in the prior art.

SUMMARY

Embodiments of the present invention provide a location information reporting method and apparatus, to provide a method for reporting location information of a terminal device to a core network control plane network element in time when the terminal device is in an inactive state.

To resolve the foregoing technical problem, the embodiments of the present invention use the following technical solutions.

According to a first aspect, an embodiment of the present invention provides a location information reporting method, including: receiving, by a first base station, a first message sent by a core network device, where the first message includes first instruction information used to instruct to report location information of a terminal device, and the first base station and the core network device have a control plane connection established for the terminal device; and sending, by the first base station, a second message including second instruction information to a second base station, where the second instruction information is used to instruct to report the location information of the terminal device, and the second base station is configured to provide a service for the terminal device at a current moment.

This application provides the location information reporting method. When the terminal device is in an inactive state, the first base station and the core network device may not know a base station that serves the terminal device at the current moment. Therefore, the first base station receives the first instruction information that is sent by the core network device and that is used to instruct to report the location information of the terminal device, and sends the second instruction information to the second base station, to instruct to report the location information of the terminal device. In this case, the second base station that serves the terminal device at the current moment can report the location information of the terminal device to the core network device, or report the location information of the terminal device to the core network device by using the first base station, so that the core network device obtains the location information of the terminal device in time when the terminal device is in the inactive state.

With reference to the first aspect, in a first possible implementation of the first aspect, the second instruction information includes at least one of the first instruction information and a first instruction, the first instruction is generated based on the first instruction information, and the second instruction is used to instruct to report the location information of the terminal device. For example, the first instruction information may be request type information.

With reference to the first aspect or the first possible implementation of the first aspect, in a second possible implementation of the first aspect, the second message is a reply message for a message that is sent by the first base station to the second base station and that is used to obtain a context of the terminal device. In this case, the first base station may determine, by using the message used to obtain the context of the terminal, the second base station that serves the terminal device at the current moment, so that the first base station can send the second instruction information to the second base station that serves the terminal device at the current moment, to avoid high signaling overheads caused by sending the second instruction information to all base stations in an RNA without knowing a base station that serves the terminal device. In addition, the first base station adds the second instruction information to the reply message for the message used to obtain the context of the terminal, to avoid adding new signaling, thereby further reducing signaling overheads.

With reference to the first aspect or the first possible implementation of the first aspect, in a third possible implementation of the first aspect, the second message is a paging message. The first base station may instruct, in a paging process by adding the second instruction information to the paging message, the second base station to obtain the location information of the terminal device, so that the second base station can report the location information of the terminal device as early as possible.

With reference to the first aspect or the third possible implementation of the first aspect, in a fourth possible implementation of the first aspect, the method provided in this application further includes: sending, by the first base station to the core network device, a third message that carries information used to indicate that the terminal device is outside a coverage area of the first base station or information used to indicate that a serving base station reports the location information of the terminal device to the core network device. The first base station adds, to the third message, the information used to indicate that the terminal device is outside the coverage area of the first base station, so that the core network device can be prevented from retriggering paging, and the core network device can determine, by using another network element such as the second base station, that the location information of the terminal device is obtained.

With reference to the first aspect to the fourth possible implementation of the first aspect, in a fifth possible implementation of the first aspect, the method provided in this application further includes: receiving, by the first base station, a fourth message that is sent by the second base station and that carries the location information of the terminal device; and determining, by the first base station, the location information of the terminal device based on the fourth message, and sending the location information of the terminal device to the core network device. The first base station obtains the location information of the terminal device from the second base station, and sends the location information of the terminal device to the core network device, to avoid a problem that is caused because the second base station changes the core network device and that occurs in a process in which the second base station reports the location information of the terminal device.

With reference to the first aspect to the fifth possible implementation of the first aspect, in a sixth possible implementation of the first aspect, when the first base station sends the second instruction information to the second base station in the paging message, the location information of the terminal device includes tracking area information TAI or a registration area identity of the terminal device.

With reference to the first aspect to the sixth possible implementation of the first aspect, in a seventh possible implementation of the first aspect, when the first base station adds the second instruction information to the reply message for the message that is sent by the first base station to the second base station and that is used to obtain the context of the terminal, the location information of the terminal device includes tracking area information TAI or a registration area identity of the terminal device, and identification information of a cell in which the terminal device is currently located.

With reference to the first aspect to the seventh possible implementation of the first aspect, in an eighth possible implementation of the first aspect, when the second message is the paging message, the fourth message is a request message used to obtain the context of the terminal or a signaling message newly defined between the first base station and the second base station. When the fourth message is the request message used to obtain the context of the terminal, a field that carries the location information of the terminal device may be added to the request message used to obtain the context of the terminal, to avoid signaling overheads caused by redefining the signaling message.

With reference to the first aspect to the eighth possible implementation of the first aspect, in a ninth possible implementation of the first aspect, the method provided in this application further includes: if the first base station determines that the terminal device cannot be paged, sending, by the first base station to the core network device, a fifth message including information used to indicate that the terminal device fails to be paged, so that the core network device performs another operation after receiving the fifth message, for example, re-initiates paging of the terminal device.

According to a second aspect, a location information reporting method provided in this application includes: receiving, by a second base station, a second message that is sent by a first base station and that includes second instruction information, where the second instruction information is used to instruct to report location information of a terminal device, the first base station and a core network device have a control plane connection established for the terminal device, and the second base station is configured to provide a service for the terminal device at a current moment; and sending, by the second base station, the location information of the terminal device to a receiving device (for example, which may be the first base station or the second base station) according to the second instruction information.

With reference to the second aspect, in a first possible implementation of the second aspect, the sending, by the second base station, the location information of the terminal device to a receiving device according to the second instruction information is specifically: The second base station may send the location information of the terminal device to the receiving device by using a seventh message. When the receiving device is the first base station, the seventh message may be a signaling message newly defined between the first base station and the second base station. Alternatively, when the second message is a paging message, the seventh message may be a message used to request a context of the terminal device. When the receiving device is the core network device, the seventh message may be an existing signaling message between the second base station and the core network device, where the existing signaling message includes a field that may carry the location information of the terminal device; or the seventh message is a signaling message newly defined between the second base station and the core network device; or the seventh message is a location information report. Alternatively, when a path switch process exists between the second base station and the core network device, the second base station may add the location information of the terminal device to a path switch request sent to the core network device. In other words, the seventh message may be the path switch request.

With reference to the second aspect or the first possible implementation of the second aspect, in a second possible implementation of the second aspect, the second message is a reply message for the message that is sent by the first base station to the second base station and that is used to request the context of the terminal device.

With reference to the second aspect or the first possible implementation of the second aspect, in a third possible implementation of the second aspect, the second message is the paging message.

With reference to any one of the second aspect to the third possible implementation of the second aspect, in a fourth possible implementation of the second aspect, the method provided in this application further includes: sending, by the second base station to the terminal device, a sixth message used to instruct the terminal device to keep an inactive state, or sending, by the second base station to the terminal device, a sixth message used to instruct the terminal device to enter an RRC connected state.

With reference to the second aspect to the fourth possible implementation of the second aspect, in a fifth possible implementation of the second aspect, the sending, by the second base station, the location information of the terminal device to a receiving device according to the second instruction information further includes: sending, by the second base station, identification information of the terminal device to the receiving device. Specifically, when the receiving device is the core network device, the second base station needs to send the identification information of the terminal device, so that the core network device can determine a terminal device to which the reported location information is specific.

According to a third aspect, this application provides a location information reporting method, including: sending, by a core network device, a first message to a first base station, where the first message includes first instruction information used to instruct to report location information of a terminal device, and the first base station and the core network device have a control plane connection established for the terminal device; and receiving, by the core network device, the location information that is of the terminal device and that is sent by a sending device, or receiving, by the core network device, information that is sent by the first base station and that is used to indicate that the terminal device fails to be paged.

With reference to the third aspect, in a first possible implementation of the third aspect, the sending device is a second base station configured to provide a service for the terminal device at a current moment. The method provided in this application further includes: receiving, by the core network device, a third message sent by the first base station, where the third message carries information used to indicate that the terminal device is outside a coverage area of the first base station. For example, the third message may be a reply message for the first message, for example, a location report failure message.

With reference to the third aspect or the first possible implementation of the third aspect, in a second possible implementation of the third aspect, when the sending device is the first base station, the first base station may add the location information of the terminal device to the reply message for the first message sent by the core network device. For example, when the first message is a location report control message, the reply message may be a location report message. Certainly, the reply message may alternatively be another signaling message, for example, a signaling message newly defined between the first base station and the core network device, or an existing signaling message between the core network device and the first base station, where the existing signaling message includes a field that may carry the location information of the terminal device. When the sending device is the second base station, the second base station may send the location information of the terminal device to the core network device in a path switch process with the core network device, or send the location information of the terminal device to the core network device by using an existing signaling message between the second base station and the core network device, or a signaling message newly defined between the second base station and the core network device, or a location information report, where the existing signaling message includes a field that may carry the location information of the terminal device. This is not limited in this application.

Correspondingly, according to a fourth aspect, this application provides a location information reporting apparatus, and the location information reporting apparatus may implement the location information reporting method described in any one of the first aspect or the possible implementations of the first aspect. For example, the location information reporting apparatus may be a first base station or a chip disposed in a first base station. The location information reporting apparatus may implement the foregoing method by using software or hardware, or by using hardware executing corresponding software.

In a design, an example in which the location information reporting apparatus is the first base station is used herein. The first base station includes: a receiving unit, configured to receive a first message sent by a core network device, where the first message includes first instruction information used to instruct to report location information of a terminal device, and the first base station and the core network device have a control plane connection established for the terminal device; and a sending unit, configured to send a second message to a second base station, where the second message includes second instruction information, the second instruction information is used to instruct to report the location information of the terminal device, and the second base station is configured to provide a service for the terminal device at a current moment.

In a possible design, the second instruction information includes at least one of a first instruction and the first instruction information, the first instruction is generated based on the first instruction information, and the first instruction is used to instruct to report the location information of the terminal device.

In a possible design, the second message is a reply message for a message that is sent by the first base station to the second base station and that is used to obtain a context of the terminal device; or the second message is a paging message.

In a possible design, the sending unit is further configured to send a third message to the core network device, where the third message carries information used to indicate that the terminal device is outside a coverage area of the first base station.

In a possible design, the receiving unit is further configured to receive a fourth message sent by the second base station, where the fourth message carries the location information of the terminal device. A determining unit is further configured to determine the location information of the terminal device based on the fourth message. The sending unit is further configured to send the location information of the terminal device to the core network device.

In a possible design, the location information of the terminal device includes at least one of the following items: tracking area information TAI of the terminal device, a registration area identity of the terminal device, and identification information of a cell in which the terminal device is currently located.

In a possible design, when the second message is the paging message, the fourth message is a request message used to obtain the context of the terminal device.

In a possible design, the determining unit is further configured to determine that the terminal device cannot be paged. The sending unit is further configured to: when the determining unit determines that the terminal device cannot be paged, send a fifth message to the core network device, where the fifth message includes information used to indicate that the terminal device fails to be paged.

According to a fifth aspect, in a possible design, the location information reporting apparatus may be a first base station or a chip applied to a first base station, and the location information reporting apparatus may include at least one processor. The at least one processor is configured to execute an instruction to support the location information reporting apparatus in performing a related message processing or control operation performed on the location information reporting apparatus side in the method described in any one of the first aspect or the possible implementations of the first aspect. Optionally, the apparatus may further include a memory, configured to be coupled to the at least one processor, and the memory stores a program and data that are necessary for the apparatus. In addition, optionally, the location information reporting apparatus may further include a communications interface, configured to support the location information reporting apparatus in communicating with another network element (for example, a core network device or a second base station). The communications interface may be a transceiver circuit. The transceiver circuit is configured to support the location information reporting apparatus in performing related message receiving and sending operations performed on the location information reporting apparatus side in the method described in any one of the first aspect or the possible implementations of the first aspect. Optionally, the location information reporting apparatus may further include a bus. The memory, the communications interface, and the at least one processor may be connected to each other by using the bus.

Correspondingly, according to a sixth aspect, this application provides a location information reporting apparatus, and the location information reporting apparatus may implement the location information reporting method described in any one of the second aspect or the possible implementations of the second aspect. For example, the location information reporting apparatus may be a second base station or a chip disposed in a second base station. The location information reporting apparatus may implement the foregoing method by using software or hardware, or by using hardware executing corresponding software.

In a design, an example in which the location information reporting apparatus is the second base station is used herein. The second base station includes: a receiving unit, configured to receive a second message sent by a first base station, where the second message includes second instruction information, the second instruction information is used to instruct to report location information of the terminal device, the first base station and the core network device have a control plane connection (for example, an NG connection) established for the terminal device, and the second base station is configured to provide a service for the terminal device at a current moment; and a sending unit, configured to send the location information of the terminal device to a receiving device according to the second instruction information.

In a design, the sending unit is specifically configured to send the location information of the terminal device to the first base station by using a seventh message. When the receiving device is the first base station, the seventh message may be a signaling message newly defined between the first base station and the second base station. Alternatively, when a first message is a paging message, the seventh message may be a message used to request a context of the terminal device. When the receiving device is the core network device, the seventh message may be an existing signaling message between the second base station and the core network device, where the existing signaling message includes a field that may carry the location information of the terminal device; or the seventh message is a signaling message newly defined between the second base station and the core network device; or the seventh message is a location information report.

In a design, the second message is a reply message for the message that is sent by the first base station to the second base station and that is used to request the context of the terminal device.

In a design, the second message is the paging message.

In a design, the sending unit is further configured to send, to the terminal device, a sixth message used to instruct the terminal device to keep an inactive state, or the sending unit is configured to send, to the terminal device, a sixth message used to instruct the terminal device to enter an RRC connected state.

In a design, the sending unit is further configured to send identification information of the terminal device to the receiving device. Specifically, when the receiving device is the core network device, the second base station needs to send the identification information of the terminal device, so that the core network device can determine a terminal device to which the reported location information is specific.

According to a seventh aspect, this application provides a location information reporting apparatus. The location information reporting apparatus may be a second base station or a chip applied to a second base station, and the location information reporting apparatus may include at least one processor. The processor is configured to support the location information reporting apparatus in performing a related message processing or control operation performed on the location information reporting apparatus side in the method described in any one of the second aspect or the possible implementations of the second aspect. Optionally, the location information reporting apparatus may further include a memory. The memory is configured to be coupled to the at least one processor, and the memory stores a program and data that are necessary for the location information reporting apparatus. In addition, optionally, the location information reporting apparatus may further include a communications interface, configured to support the location information reporting apparatus in communicating with another network element (for example, a core network device or a first base station). The communications interface may be a transceiver circuit. The transceiver circuit is configured to support the location information reporting apparatus in performing related message receiving and sending operations performed on the location information reporting apparatus side in the method described in any one of the second aspect or the possible implementations of the second aspect. Optionally, the location information reporting apparatus further includes a bus. The memory, the transceiver circuit, and the at least one processor are connected to each other by using the bus.

Correspondingly, according to an eighth aspect, this application provides a location information reporting apparatus, and the location information reporting apparatus may implement the location information reporting method described in any one of the third aspect or the possible implementations of the third aspect. For example, the location information reporting apparatus may be a core network device or a chip disposed in a core network device. The location information reporting apparatus may implement the foregoing method by using software or hardware, or by using hardware executing corresponding software.

In a design, the core network device includes a sending unit and a receiving unit. The sending unit is configured to send a first message to a first base station, where the first message includes first instruction information used to instruct to report location information of a terminal device, and the first base station and the core network device have a control plane connection established for the terminal device. The receiving unit is configured to receive the location information that is of the terminal device and that is sent by a sending device, or the receiving unit is configured to receive information that is sent by the first base station and that is used to indicate that the terminal device fails to be paged.

In a design, the sending device is a second base station configured to provide a service for the terminal device at a current moment. The receiving unit is further configured to receive a third message sent by the first base station, where the third message carries information used to indicate that the terminal device is outside a coverage area of the first base station. For example, the third message may be a reply message for the first message, for example, a location failure report message.

In a design, when the sending device is the first base station, the first base station may add the location information of the terminal device to the reply message for the first message sent by the core network device. For example, when the first message is a location control report message, the reply message may be a location report message. Certainly, the reply message may alternatively be another signaling message, for example, a signaling message newly defined between the first base station and the core network device, or an existing message between the core network device and the first base station, and the existing message includes a field that may carry the location information of the terminal device. When the sending device is the second base station, the second message may be a location report message, another signaling message, or a path switch request in a process in which the second base station performs a path request with the core network device. This is not limited in this application.

According to a ninth aspect, this application provides a location information reporting apparatus. The location information reporting apparatus may be a core network device or a chip applied to a core network device, and the location information reporting apparatus may include at least one processor. The processor is configured to support the location information reporting apparatus in performing a related message processing or control operation performed on the location information reporting apparatus side in the method described in any one of the third aspect or the possible implementations of the third aspect. Optionally, the location information reporting apparatus may further include a memory. The memory is configured to be coupled to the at least one processor, and the memory stores a program and data that are necessary for the location information reporting apparatus. In addition, optionally, the location information reporting apparatus may further include a communications interface, configured to support the location information reporting apparatus in communicating with another network element (for example, a second base station or a first base station). The communications interface may be a transceiver circuit. The transceiver circuit is configured to support the location information reporting apparatus in performing related message receiving and sending operations performed on the location information reporting apparatus side in the method described in any one of the third aspect or the possible implementations of the third aspect. Further, optionally, the location information reporting apparatus may further include a bus. The memory, the transceiver circuit, and the at least one processor are connected to each other by using the bus.

According to a tenth aspect, this application provides a computer readable storage medium. When the computer readable storage medium is applied to a first base station, the computer readable storage medium stores an instruction. When the instruction is run on a computer, the computer is enabled to perform the location information reporting method described in any one of the first aspect or the possible implementations of the first aspect.

According to an eleventh aspect, this application provides a computer readable storage medium. When the computer readable storage medium is applied to a second base station, the computer readable storage medium stores an instruction. When the instruction is run on a computer, the computer is enabled to perform the location information reporting method described in any one of the second aspect or the possible implementations of the second aspect.

According to a twelfth aspect, this application provides a computer readable storage medium. When the computer readable storage medium is applied to a core network device, the computer readable storage medium stores an instruction. When the instruction is run on a computer, the computer is enabled to perform the location information reporting method described in any one of the third aspect or the possible implementations of the third aspect.

According to a thirteenth aspect, this application provides a chip system, applied to a first base station. The chip system includes at least one processor and an interface circuit, the interface circuit and the at least one processor are connected to each other by using a line, and the processor is configured to run an instruction stored in the chip system, to perform the location information reporting method described in any one of the first aspect or the possible implementations of the first aspect.

According to a fourteenth aspect, this application provides a chip system, applied to a second base station. The chip system includes at least one processor and an interface circuit, the interface circuit and the at least one processor are connected to each other by using a line, and the processor is configured to run an instruction, to perform the location information reporting method described in any one of the second aspect or the possible implementations of the second aspect.

According to a fifteenth aspect, this application provides a chip system, applied to a core network device. The chip system includes at least one processor and an interface circuit, the interface circuit and the at least one processor are connected to each other by using a line, and the processor is configured to run an instruction, to perform the location information reporting method described in any one of the third aspect or the possible implementations of the third aspect.

Optionally, the chip system in this application further includes at least one memory, and the at least one memory stores the instruction.

According to a sixteenth aspect, this application provides a computer program product including an instruction, and the computer program product stores the instruction. When the instruction is run, a first base station is enabled to perform the location information reporting method described in any one of the first aspect or the possible designs of the first aspect.

According to a seventeenth aspect, this application provides a computer program product including an instruction, and the computer program product stores the instruction. When the instruction is run, a second base station is enabled to perform the location information reporting method described in any one of the second aspect or the possible designs of the second aspect.

According to an eighteenth aspect, this application provides a computer program product including an instruction, and the computer program product stores the instruction. When the instruction is run, a core network device is enabled to perform the location information reporting method described in any one of the third aspect or the possible designs of the third aspect.

According to a nineteenth aspect, this application provides a communications system, and the communications system includes the first base station described in the fourth aspect or the fifth aspect, at least one second base station described in the sixth aspect or the seventh aspect, and the core network device described in the eighth aspect or the ninth aspect.

In a possible design, the communications system may further include another device that interacts with the first base station, the second base station, or the core network device and that is in the solutions provided in the embodiments of the present invention.

DETAILED DESCRIPTION OF ILLUSTRATIVE EMBODIMENTS

The terms "first", "second", and the like in this application are merely intended to distinguish between different objects, and do not limit their sequence. For example, a first base station and a second base station are merely intended to distinguish between different base stations, and do not limit a sequence of the first base station and the second base station.

The term "and/or" in this application describes only an association relationship for describing associated objects and represents that three relationships may exist. For example, A and/or B may represent the following three cases: Only A exists, both A and B exist, and only B exists. In addition, the character "/" in this application usually indicates an "or" relationship between the associated objects.

It should be noted that in this application, the word such as "example" or "for example" is used to indicate an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a related concept in a specific manner.

Figure 1:
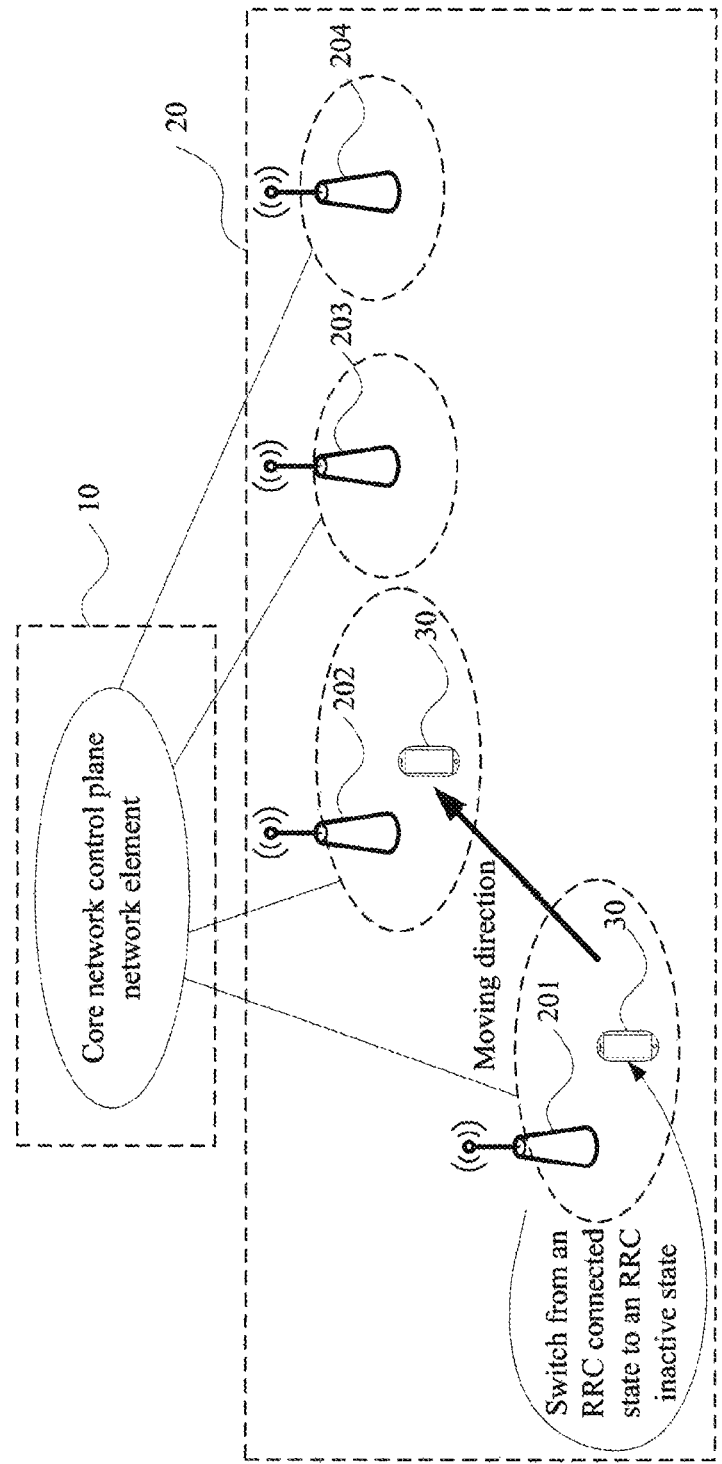
FIG. 1 is a diagram of an architecture of a communications system in this application.

As shown in FIG. 1, FIG. 1 is a schematic diagram of an architecture of a communications system to which a location information reporting method is applied in this application. As shown in FIG. 1, the communications system includes a 5G core network (5GCN) 10, an access network 20 (for example, a 5G radio access network (RAN) shown in FIG. 1), and a terminal device 30. The core network 10 includes at least one or more core network control plane network elements, for example, an AMF 101. The access network 20 includes at least two base stations, for example, a base station 201, a base station 202, and a base station 203.

One of the at least two base stations and the core network control plane network element have a control plane connection established for the terminal device 30. Therefore, the base station that establishes the control plane connection to the core network control plane network element for the terminal device 30 may be referred to as a camping gNB (next generation NodeB (gNB)). The camping gNB reserves context information of the terminal device 30 (the context information of the terminal device may be consistent with a context in an RRC connected state or be a part of the context in the RRC connected state). For example, the camping gNB may be a base station accessed when the terminal device 30 is in the RRC connected state, for example, the base station 201 shown in FIG. 1.

The access network 20 in this application forms an RNA. The RNA includes one or more cells. The terminal device 30 may move in the RNA. When the RNA includes a plurality of cells, the plurality of cells may be served by one base station or may be served by a plurality of base stations. In addition, the RNA may further include one or more cells covered by an eLTE evolved NodeB, a 5G gNB, and a 3G NodeB. This is not limited in this application.

One of the at least two base stations is a base station that provides a service for the terminal device when the terminal device is in an RRC inactive state, and may be referred to as a serving base station. The serving base station is synchronized with the terminal device in a downlink direction. The terminal device may receive a broadcast signal sent by the serving base station. In addition, when the terminal device needs to perform signaling interaction with a network side, for example, the terminal device needs to send data at a current moment, the terminal device may interact with the network by using the serving base station.

It should be noted that when the terminal device switches from the RRC connected state to the RRC inactive state, the terminal device 30 may move in the RNA. For example, the terminal device 30 may move from a coverage area of the camping gNB to a coverage area of the serving base station. For example, as shown in FIG. 1, the terminal device 30 moves from a coverage area of the base station 201 to a coverage area of the base station 202. It may be understood that in this case, the terminal device 30 is still located in the RNA. However, because the terminal device 30 has entered the RRC inactive state, in a moving process of the terminal device, the core network and the camping gNB do not know a serving base station that provides a service for the terminal device 30 after the movement and location information of the terminal device.

The core network needs to be notified when the terminal device moves out of the RNA, to perform a location update operation, namely, an RNA update operation. For details of the operation, refer to a tracking area update (TAU) in LTE. The details are not described herein in this application.

The AMF 101 is configured to provide mobility management and access management functions of the terminal device 30.

In addition, the communications system further includes an evolved long term evolution (eLTE) eNB 40. The eLTE eNB 40 may be connected to the 5G core network, and the eLTE eNB 40 may support the RRC inactive state or a state similar to the RRC inactive state.

An interface between the 5G core network 10 and the eLTE eNB 40 and an interface between the 5G core network 10 and one of the at least two base stations may be RAN-CN interfaces, and an interface between the camping gNB and the serving base station may be an Inter-BS interface. A name of each interface is not limited in this application.

The camping gNB and the serving base station in this application may be a base station that can communicate with the terminal device 30, or may be an access point (AP) in a wireless local area network (WLAN), a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB) in LTE, a relay node or an access point, a vehicle-mounted device, a wearable device, a gNB in a future 5G network, a network device in a future evolved public land mobile network (PLMN), or the like.

The terminal device 30 may also be referred to as a terminal, user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (station, STA) in a wireless local area network (WLAN), or may be a cellular phone, a cordless phone, a session initiation protocol (SIP) phone, a wireless local loop (WLL) station, a personal digital Assistant (PDA) device, a handheld device having a wireless communication function, a computing device or another processing device connected to a wireless modem, a vehicle-mounted device, a wearable device, a terminal device in a next generation communications system such as a 5th generation (5G) communications network, a terminal device in a future evolved public land mobile network (PLMN) network, or the like.

In an example, in this embodiment of the present invention, the terminal device 30 may alternatively be a wearable device. The wearable device may also be referred to as a wearable intelligent device, and is a general term for wearable devices such as glasses, gloves, a watch, clothes, and shoes that are developed by applying wearable technologies in intelligent designs of daily wear. The wearable device is a portable device that is directly worn on a body or integrated into clothes or an accessory of a user. The wearable device is not merely a hardware device, but implements a powerful function through software support, data exchange, and cloud interaction. In a broad sense, the wearable intelligent device includes a full-featured and large-sized device that can implement complete or partial functions without depending on a smartphone, such as a smart watch or smart glasses, and a device that focuses on only one type of application function and needs to work with another device such as a smartphone, such as various smart bands or smart jewelry for monitoring physical signs.

After the terminal device switches from the RRC connected state to the RRC inactive state, when the terminal device in the RRC inactive state moves in the RNA, a core network device may not know the location information of the terminal device. Based on this, in this application, a first base station receives a first message that is sent by the core network device and that is used to instruct to report the location information of the terminal device, and sends second instruction information to a second base station based on the first message, to instruct the second base station to report the location information of the terminal device. In this case, the second base station that serves the terminal device at a current moment can report the location information of the terminal device to the core network device in time, or report the location information of the terminal device to the core network device by using the first base station, so that the core network device obtains the location information of the terminal device in time when the terminal device is in the inactive state. After learning of the location information of the terminal device, the core network device may make a policy decision and initiate a policy update by integrating the location information, usage traffic, a network status, and the like that are of the terminal device.

The core network device in this application is a core network control plane network element in the core network, for example, an AMF.

Figure 2:
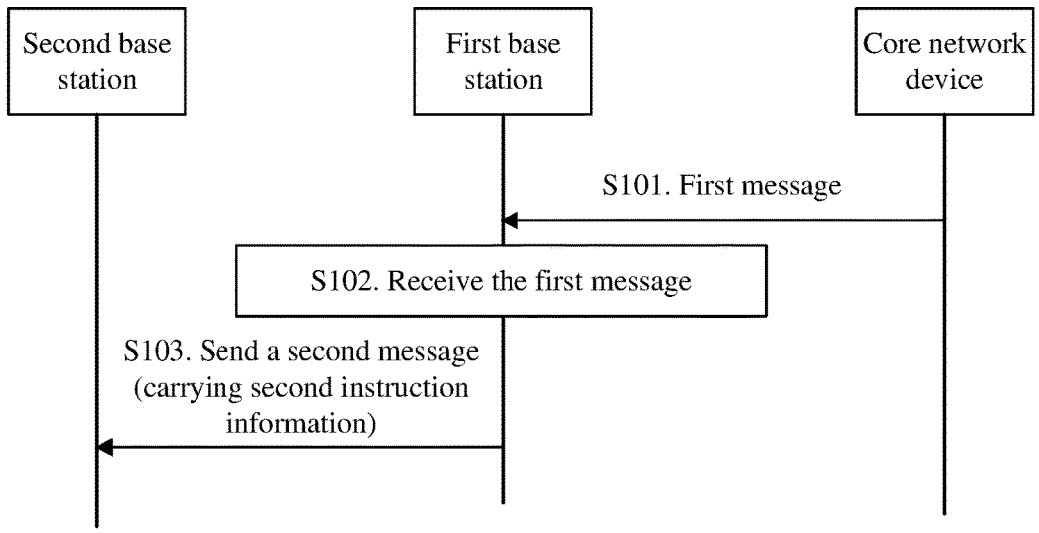
FIG. 2 is a schematic flowchart 1 of a location information reporting method according to an embodiment of the present invention.

Based on the architecture shown in FIG. 1, as shown in FIG. 2, a location information reporting method provided in this application includes the following steps.

S101. A core network device sends a first message to a first base station, where the first message is used to instruct to obtain location information of a terminal device, and the first base station and the core network device have a control plane connection established for the terminal device.

As shown in FIG. 2, the first base station may be a camping gNB, for example, the base station 201.

For example, the first message may be a location report control message.

Optionally, the first message includes first instruction information, and the first instruction information is used to instruct to report the location information of the terminal device.

For example, the first instruction information may be request type information, and the request type information is used to indicate a type of the reported location information of the terminal device.

Different types indicate different obtained location information of the terminal device.

For example, when the type of the location information of the terminal device is a first type, the first type is used to instruct to report last obtained location information of the terminal device. When the type of the location information of the terminal device is a second type, the second type is used to instruct to report location information of the terminal device at a current moment.

Optionally, the second type may be standalone.

It should be noted that an example in which the request type request type information is in standalone is used in this application.

Optionally, the location report control message carries a first identifier of the terminal device, and the first identifier of the terminal device is used to identify the terminal device, so that the first base station can determine, based on the first identifier, a terminal device whose location information needs to be reported.

S102. The first base station receives the first message sent by the core network device.

S103. The first base station sends a second message to a second base station, where the second message includes second instruction information, the second instruction information is used to instruct to report the location information of the terminal device, and the second base station is configured to provide a service for the terminal device at a current moment.

For example, the second base station may be the base station 202 shown in FIG. 1.

Optionally, the second instruction information may include at least one of the first instruction information and a first instruction, the first instruction is generated based on the first instruction information, and the first instruction is used to instruct to report the location information of the terminal device.

It may be understood that the first instruction information may also be used to instruct to report the location information of the terminal device.

The second instruction information may be in a plurality of forms in this application. For example, the second instruction information may be the first instruction information. Alternatively, the second instruction information may be the first instruction, and the first instruction is generated based on the first instruction information. Alternatively, the second instruction information may be the first instruction and the first instruction information. This is not limited in this application.

In this application, after receiving the first message, the first base station may start to page a terminal device indicated by the first identifier.

In this application, the first base station may send the second message to the second base station in different scenarios. The second message may be in different forms in the different scenarios. Descriptions are separately provided below with reference to the different scenarios.

Scenario 1: If the first base station sends the second message in a paging process, the second message may be a paging message.

Optionally, the paging message further carries identification information of the terminal device and information used to indicate paging.

For example, the identification information of the terminal device is used to identify the terminal device, and may be an international identity of the terminal device, or may be an identifier that uniquely identifies the terminal device in an RNA, for example, a resume ID. Certainly, the identification information of the terminal device may alternatively be the first identifier.

Scenario 2: In a process in which the second base station requests a context of the terminal device from the first base station, the first base station sends the second instruction information to the second base station by using the second message. In this case, the second message may be a reply message for a message (for example, a request message used to obtain the context of the terminal device) used to request the context of the terminal device. For example, the reply message for the message used to request the context of the terminal device may be a reply message used to obtain the context of the terminal device.

Specifically, the process in which the second base station requests the context of the terminal device from the first base station may include: The first base station pages the terminal device by using a base station (for example, the base station 201, the base station 202, and the base station 203 shown in FIG. 1) in the RNA. For example, after receiving the first message, the first base station starts to send a paging message to another base station in the RNA. In this case, all base stations in the RNA send the paging message to the terminal device, to page the terminal device. Then, a process in which the terminal device requests to enter an RRC state may be specifically: sending a resume request message (for example, an RRC connection resume request message) to a serving base station, where the resume request message is used to request to resume to an RRC connected state. After receiving the resume request message, the second base station sends, to the first base station, the request message used to obtain the context of the terminal device, to enter the process in which the second base station requests the context of the terminal device from the first base station.

Scenario 3: After the process in which the second base station requests the context of the terminal device from the first base station, the first base station sends the second instruction information to the serving base station. In this case, the second message may be information newly defined between the first base station and the second base station, and the newly defined message is used to request to obtain location information of the terminal device at a current moment. For example, the first message may be a request message used to obtain a terminal location or a notification message used to obtain the terminal location. A name of the first message is not limited in this application.

This application provides the location information reporting method. When the terminal device is in an inactive state, the first base station and the core network device may not know a base station that serves the terminal device at a current moment or may not obtain the location information of the terminal device in time. Therefore, the first base station receives the first message that is sent by the core network device and that is used to instruct to report the location information of the terminal device, and sends the second instruction information to the second base station based on the first message, to instruct the second base station to report the location information of the terminal device. In this case, the second base station that serves the terminal device at the current moment can report the location information of the terminal device to the core network device in time, or report the location information of the terminal device to the core network device by using the first base station, so that the core network device obtains the location information of the terminal device in time when the terminal device is in the inactive state.

It should be noted that regardless of the scenario 1, the scenario 2, or the scenario 3, both the first base station and the second base station may report the location information of the terminal device to the core network device. However, in the different scenarios, steps performed by the first base station and the second base station may be different, and therefore are separately described below.

Figure 3:
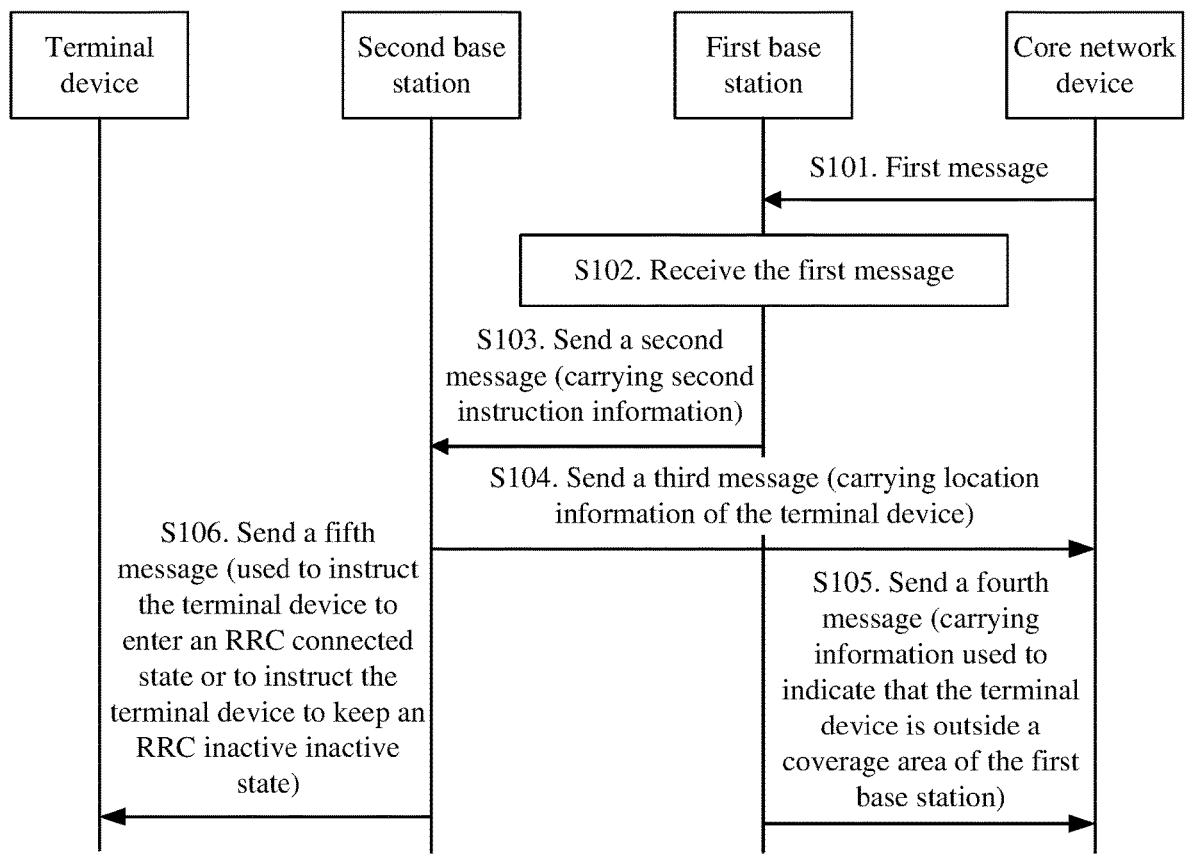
FIG. 3 is a schematic flowchart 2 of a location information reporting method according to an embodiment of the present invention.

In a possible implementation, when the second base station reports the location information of the terminal device to the core network device, based on FIG. 2, as shown in FIG. 3, the method provided in this application further includes the following steps.

S104a. The second base station receives the second message sent by the first base station.

S104. The second base station sends a third message to the core network device, where the third message includes the location information of the terminal device.

Optionally, the third message may be a location report message, or may be a signaling message newly defined between the second base station and the core network device. The new signaling message carries the location information of the terminal device. Alternatively, the third message may be an existing signaling message between the second base station and the core network device in a subsequent communication process. A field in the existing signaling message is used to carry the location information of the terminal device. For example, a message (used to request to change a camping gNB that serves the terminal device) that the second base station requests path switch from the core network device may be referred to as a path switch request message or a path switch request. A name of the message that the second base station requests the path switch from the core network device is not limited in this application. The field may be newly added to the existing signaling message, or may be a reserved field in the existing signaling message.

The location information of the terminal device includes any one of the following items: tracking area information TAI of the terminal device, a registration area identity of the terminal device, and identification information of a cell in which the terminal device is currently located.

It should be noted that in the scenarios 2 and 3, after a process in which the first base station pages the terminal device by using the base station in the RNA, the following content further needs to be included.

The second base station obtains the second instruction information from the first base station in the process in which the second base station requests the context of the terminal device from the first base station.

When the terminal device and the second base station have a data transmission requirement, the second base station may further perform a path switch process with the core network device. After the second base station performs the path switch with the core network device, the second base station and the core network device have a control plane connection for the terminal device, so that the core network device determines that a base station that serves the terminal device at a current moment is the second base station.

Specifically, the path switch process includes:

The second base station sends a path switch request to the core network device, where the path switch request is used to indicate that the second base station is a camping gNB that serves the terminal device, and the core network device sends a reply message for the path switch request to the second base station.

In the scenario 1, the process in which the second base station requests the context of the terminal device from the first base station and the path switch process that may be further performed by the second base station with the core network device may be omitted.

It should be noted that in the scenario 1, the third message further needs to carry identification information of the terminal device, and the identification information is used to indicate a terminal device to which the location information reported by the core network device is specific.

It should be noted that when the first base station sends the second instruction information to the second base station in the paging process, namely, the scenario 1, after paging, the process in which the second base station requests the context of the terminal device from the first base station may be omitted.

In addition, when a process of requesting the path switch exists between the second base station and the core network device, the third message in this application may alternatively be the path switch request sent by the second base station to the core network device. In this case, a step in which the second base station sends the location information of the terminal device to the core network device after the path switch request may be omitted.

S105. The first base station sends a fourth message to the core network device, where the fourth message carries information used to indicate that the terminal device is outside a coverage area of the first base station.

Specifically, the fourth message includes a first cause value, and the first cause value is the information used to indicate that the terminal device is outside the coverage area of the first base station.

Optionally, the fourth message may further carry information used to indicate that the second base station reports the location information of the terminal device.

Specifically, the fourth message may be a reply message for a location report control message, for example, a location report failure message. The location report failure message carries at least one of the information used to indicate that the terminal device is outside the coverage area of the first base station and the information used to indicate that the terminal device is outside the coverage area of the first base station.

S105a. The core network device receives the fourth message sent by the first base station.

Based on step S105a, the core network device can determine that the location information of the terminal device can be obtained from the second base station.

In addition, the method provided in this application further includes the following step:

S106. The second base station sends a fifth message to the terminal device, where the fifth message is used to instruct the terminal device to enter an RRC connected state or to instruct the terminal device to keep an RRC inactive state.

It should be noted that after the second base station sends the paging message to the terminal device, the terminal device sends a resume request message to the second base station for the paging message, and then the fifth message may be a response message for the resume request message.

Optionally, the fifth message includes first information or second information. The first information is used to instruct the terminal device to enter the RRC connected state, and the second information is used to instruct the terminal device to keep the RRC inactive state.

For example, the first information may be an RRC connection resume message, and the second information may be an RRC connection reject message, an RRC connection suspend message, or an RRC connection release message.

It should be noted that in the scenario 1, the fifth message includes the second information. In other words, the second base station instructs the terminal device to keep the RRC inactive state.

In the scenario 2, the fifth message includes the second information or the first information. In other words, the second base station may instruct the terminal device to enter the RRC connected state, or may instruct the terminal device to continue to keep the RRC inactive state.

Figure 4:
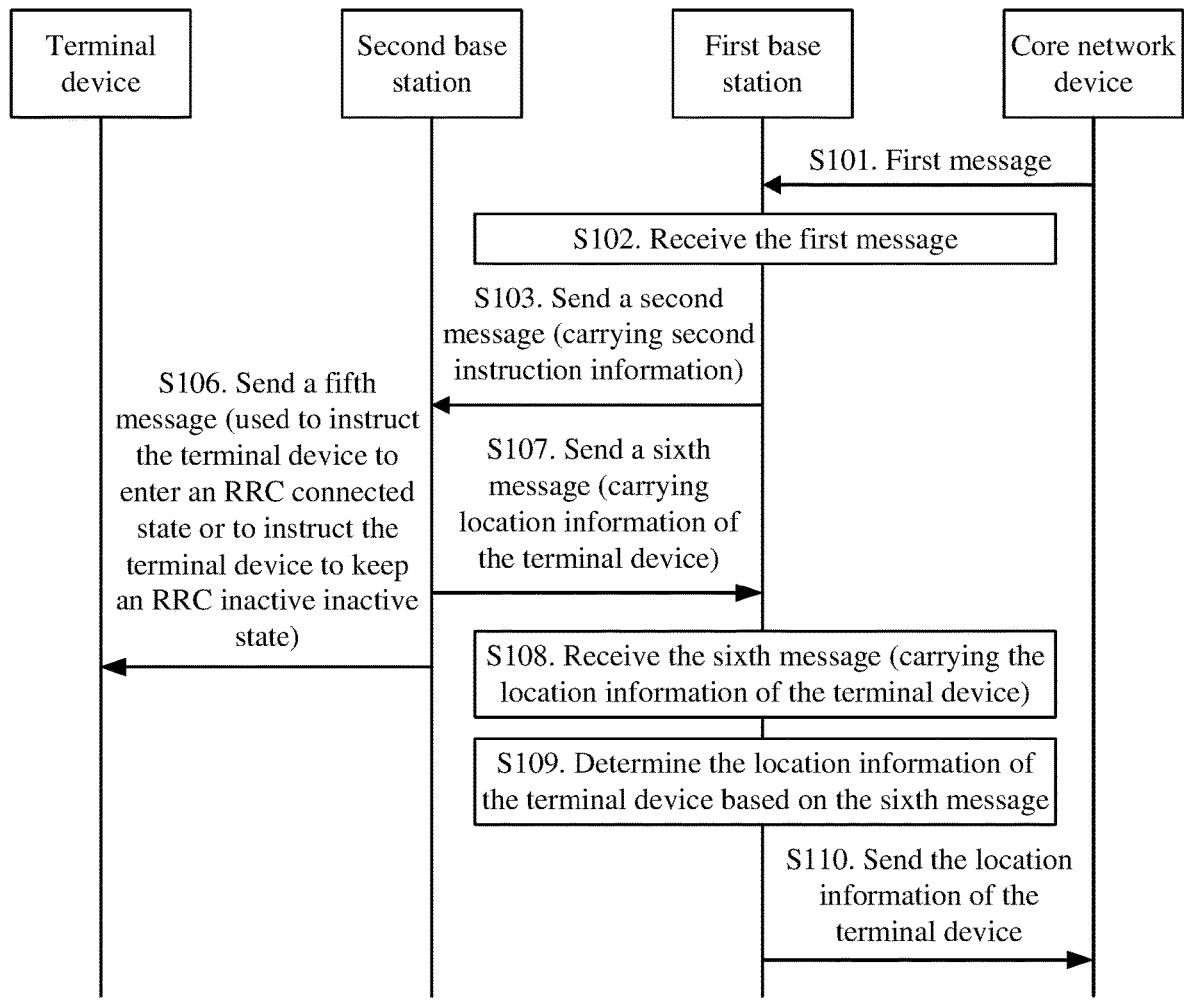
FIG. 4 is a schematic flowchart 3 of a location information reporting method according to an embodiment of the present invention.

In another possible implementation, when the first base station reports the location information of the terminal device to the core network device, based on FIG. 2, as shown in FIG. 4, the method provided in this application further includes the following steps.

S107. The second base station sends a sixth message to the first base station, where the sixth message includes the location information of the terminal device.

Optionally, the location information of the terminal device includes at least one of the following items: tracking area information TAI of the terminal device, a registration area identity of the terminal device, and identification information of a cell in which the terminal device is currently located.

Specifically, in the scenario 1, when the process in which the second base station requests the context of the terminal device from the first base station exists, the sixth message may be a request message used to obtain the context of the terminal device in the process in which the second base station requests the context of the terminal device from the first base station. The sixth message carries identification information of the terminal device. The sixth message may alternatively be a signaling message newly defined in the process in which the second base station requests the context of the terminal device from the first base station. The newly defined signaling message includes a field that may carry the location information of the terminal device. This is not limited in this application. In the scenario 1, when the process in which the second base station requests the context of the terminal device from the first base station is omitted, the sixth message may alternatively be a signaling message that needs to be exchanged between the second base station and the first base station after the paging process.

In the scenarios 2 and 3, the sixth message may be a signaling message newly defined after the process in which the second base station requests the context of the terminal device from the first base station or an existing signaling message, and the signaling message includes a field used to carry the location information of the terminal device.

S108. The first base station receives the sixth message sent by the second base station, where the sixth message carries the location information of the terminal device.

Specifically, for a form in which the first base station receives the sixth message, specifically refer to a process in which the fifth message is sent in the foregoing embodiment. This is not limited in this application.

S109. The first base station determines the location information of the terminal device based on the sixth message.

S110. The first base station sends the location information of the terminal device to the core network device.

S110a. The core network device receives the location information that is of the terminal device and that is sent by the first base station.

Specifically, the first base station sends the location information of the terminal device to the core network device in a plurality of forms. For example, the first base station may send the location information of the terminal device to the core network device by using a location report message for a location control report message. Alternatively, the first base station sends the location information of the terminal device to the core network device by using a signaling message (which may be the existing signaling message between the first base station and the core network device or the signaling message newly defined between the first base station and the core network device) between the first base station and the core network device.

It may be understood that as shown in FIG. 4, when the first base station reports the location information of the terminal device to the core network device, the method provided in this application may still include step S106.

In still another possible implementation, neither the first base station nor the second base station can page the terminal device. In this case, based on FIG. 2, the method provided in this application further includes the following steps.

S111. The first base station determines that the terminal device cannot be paged, and the first base station sends a sixth message to the core network device, where the sixth message includes information used to indicate that the terminal device fails to be paged.

Specifically, the sixth message carries a second cause value, and the second cause value is the information used to indicate that the terminal device fails to be paged.

S111a. The core network device receives the sixth message sent by the first base station.

Specifically, after receiving the sixth message sent by the first base station, the core network device can determine, based on the sixth message, whether to retrigger the core network side to page the terminal device.

Figure 5:
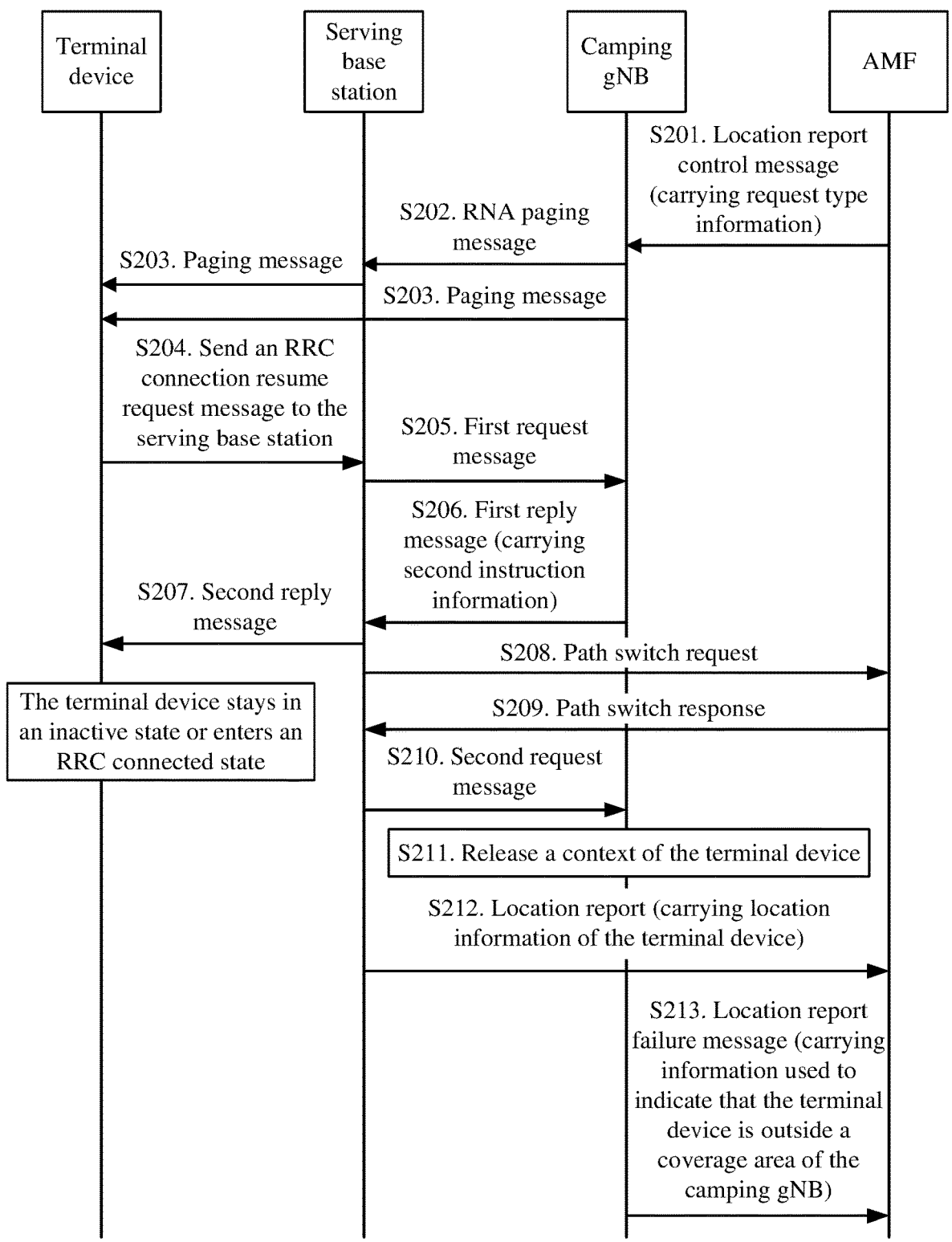
FIG. 5 is a schematic flowchart 4 of a location information reporting method according to an embodiment of the present invention.

In conclusion, a process in which the camping gNB sends the second instruction information to the serving base station in the process in which the serving base station requests the context of the terminal device and the serving base station reports the location information of the terminal device to the AMF is used as an example in FIG. 5. Specifically, FIG. 5 shows a specific procedure of a location information reporting method provided in this application. The method includes the following steps.

S201. The AMF sends a location report control message to the camping gNB, where the location report control message includes request type information.

The request type information is used to instruct to obtain the location information of the terminal device.

Optionally, the request type information indicates that a type of a location report is standalone.

It may be understood that different types of location reports indicate different location information that is of the terminal device and that is obtained by the camping gNB. For example, when the type of the location report is standalone, the type of the location report is used to instruct to obtain current location information of the terminal device. For example, when the type of the location report is a type other than standalone, the type of the location report is used to instruct the camping gNB to report location information that is of the terminal device and that is last obtained by the camping gNB.

Optionally, the location report control message carries a first identifier of the terminal device, and the first identifier of the terminal device is used to identify the terminal device.

S202a. The camping gNB receives the location report control message sent by the core network device.

S202. The camping gNB sends a paging (paging) message to a base station other than the camping gNB in an RNA, where the paging message carries a second identifier of the terminal device and information used to instruct to page the terminal device.

It should be noted that after receiving the location report control message, the camping gNB initiates a paging procedure to page the terminal device.

Optionally, the RNA includes at least a serving base station that provides a service for the terminal device at a current moment when the terminal device switches from an RRC connected state to an RRC inactive state, for example, the base station 202 shown in FIG. 2.

It may be understood that at the current moment, the terminal device is outside a coverage area of the camping gNB, and is within an area of the serving base station that provides the service for the terminal device.

For example, the second identifier may uniquely identify the terminal device in the RNA, for example, the second identifier may be a resume ID.

It may be understood that the first identifier may be the same as the second identifier.

S203. The camping gNB and the another base station (for example, a serving base station) that receives the paging message sent by the camping gNB send the paging message to the terminal device.

S204. After receiving the paging message, the terminal device sends a resume request message to the serving base station, where the resume request message may be used to request to resume to a connected state.

For example, the resume request message may be an RRC connection resume request message.

Optionally, the RRC connection resume request message may further carry identification information of the camping gNB, so that the serving base station can determine the camping gNB based on the identification information of the camping gNB, to request to obtain the context of the terminal device from the camping gNB.

S205. The serving base station sends a first request message to the camping gNB, where the first request message carries first identification information of the terminal device, and the first request message is used to obtain the context of the terminal device.

For example, the first request message may be a request message used to obtain the context of the terminal device.

Optionally, the first identification information may be the first identifier, the second identifier, or another identifier of the terminal device. This is not limited in this application, provided that the first identification information can identify the terminal device.

S206. The camping gNB sends a first reply message for the first request message to the serving base station, where the first reply message includes at least context information of the terminal device and second instruction information, and the second instruction information is used to instruct to report the location information of the terminal device.

It should be noted that the camping gNB can determine, by using the first request message, that a base station that serves the terminal device at the current moment is the serving base station.

Optionally, the second instruction information may include at least one of a first instruction and first instruction information, the first instruction is generated based on the first instruction information, and the first instruction is used to instruct to report the location information of the terminal device.

The second instruction information may be in a plurality of forms in this application. For example, the second instruction information may be the first instruction. Alternatively, the second instruction information may be the first instruction information, and the first instruction is generated based on the first instruction information. Alternatively, the second instruction information may be the first instruction information and the first instruction. This is not limited in this application. The first instruction information may be request type information.

For example, the first reply message may be a reply message used to obtain the context of the terminal device.

Optionally, the first reply message includes the first identification information of the terminal device, and the context information of the terminal device includes RRC configuration information, security information, session or stream-based QoS information, and the like.

S207. The serving base station sends a second reply message for the resume request message to the terminal device, where the second reply message carries information used to instruct the terminal device to enter an RRC connected state, or carries information used to instruct the terminal device to keep a current state (or to continue to stay in the current state, in other words, keep an inactive state).

Optionally, the second reply message may include a third message or a fourth message. The third message is used to instruct the terminal device to enter the RRC connected state, and the fourth message is used to instruct the terminal device to keep the current state.

For example, the third message may be an RRC connection resume message, and the fourth message may be an RRC connection reject message, an RRC connection suspend message, or an RRC connection release message.

After the terminal device receives the third message, the terminal device enters the RRC connected state. Alternatively, after the terminal device receives the fourth message, the terminal device keeps the current state.

S208. The serving base station sends a path switch request to the AMF.

S209. The AMF sends a path switch request response (path switch request Ack) to the serving base station.

It may be understood that after steps S208 and S209, the AMF can determine that a base station that serves the terminal device is the serving base station. To be specific, the AMF can subsequently communicate with the terminal device by using the serving base station.

S210. The serving base station sends a second request message to the camping gNB, where the second request message carries information used to instruct to release the context of the terminal device.

The second request message may be in a plurality of forms. For example, the second request message may be a message for releasing the context of the terminal device, another newly defined signaling message, or an existing signaling message. The existing signaling message carries the information used to instruct to release the context of the terminal device. This is not limited in this application.

S211. After the camping gNB receives the message for releasing the context of the terminal device, the camping gNB releases the context of the terminal device.

S212. The serving base station sends a location report to the AMF, where the location report includes the location information of the terminal device.

S212a. The core network device receives the location report sent by the serving base station.

The core network device can determine the location information of the terminal device based on step S212a.

It should be noted that because the AMF and the serving base station perform path switch in steps S208 and S209, the location report in step S212 may not carry identification information of the terminal device, so that signaling overheads can be reduced. Certainly, the location report may alternatively carry the location information of the terminal device.

In addition, the serving base station may further add the location information of the terminal device to the path switch request. In this case, step S212 may be omitted.

S213. The camping gNB sends a location report failure message to the AMF, where the location report failure message carries information used to indicate that the terminal device is outside a coverage area of the camping gNB.

Specifically, the information used to indicate that the terminal device is outside the coverage area of the camping gNB may be a first cause indication value, and the first cause indication value is used to indicate that the terminal device is outside the coverage area of the camping gNB.

Optionally, the first cause indication value is further used to indicate that a base station that provides a service for the terminal device at the current moment is the serving base station, or indicate, to the AMF, that a base station that reports the location information of the terminal device is the serving base station, so that after receiving the location report failure message, the AMF can wait for the serving base station to report the location information of the terminal device, to obtain the location information of the terminal device from the serving base station.

S213a. The core network device receives the location report failure message sent by the camping gNB.

In addition, in this application, when a path switch process exists between the serving base station and the core network device, in other words, during steps S208 and S209 in FIG. 5, step S212 may be omitted in a scenario in which the serving base station reports the location information of the terminal device to the core network device. In this case, the serving base station may add the location information of the terminal device to the path switch request in step S208, so that the core network device can determine the location information of the terminal device in the path switch process.

It should be noted that a sequence of steps S201 to S213 is not limited in this application. In addition, steps S206 to S212 and step S213 may be performed in parallel. This is not limited in this application. To be specific, in a process in which the camping gNB instructs the serving base station to report the location information of the terminal device, the camping gNB can instruct the AMF to wait for the serving base station to report the location information of the terminal device.

In addition, in the solution shown in FIG. 5, the camping gNB sends the second instruction information to the serving base station that serves the terminal device at the current moment, to avoid high signaling overheads caused because the camping gNB sends the second instruction information to all base stations in the RNA when the camping gNB does not determine the serving base station that serves the terminal device.

Figure 6:
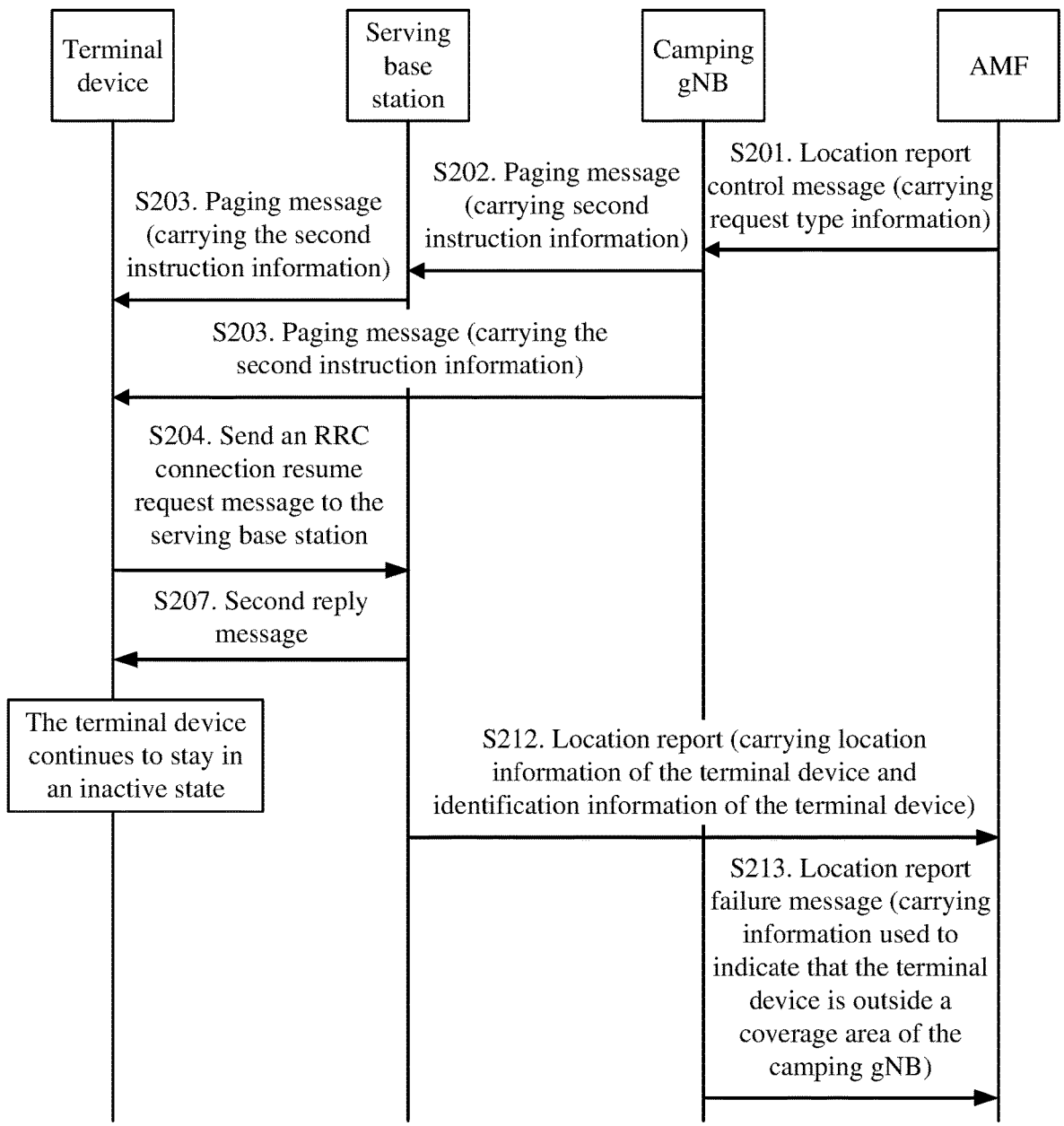
FIG. 6 is a schematic flowchart 5 of a location information reporting method according to an embodiment of the present invention.

As shown in FIG. 6, an example in which the camping gNB sends the second instruction information to the serving gNB in a process in which all base stations in an RNA page the terminal device and the serving base station reports the location information of the terminal device is used. FIG. 6 shows a specific procedure of a location information reporting method provided in this application. Differences between the method shown in FIG. 6 and the method in FIG. 5 are as follows:

The second instruction information in FIG. 5 is carried in the first reply message of the camping gNB for the first request message. In other words, the camping gNB adds the second instruction information to the reply message that is sent to the serving base station and that is used to request a context of the terminal device. The second instruction information in FIG. 6 is carried in a paging message sent by the camping gNB to all the base stations in the RNA. In other words, the camping gNB sends the second instruction information in the paging message in the process in which all the base stations in the RNA page the terminal device. To be specific, the second instruction information is carried in step S202 in addition to the information used to instruct to page the terminal device and the second identifier of the terminal device. In this way, after receiving the paging message, the serving base station can determine, based on the second instruction information, that the location information of the terminal device needs to be reported, to report the location information of the terminal device to the core network device. In other words, the serving base station can determine, in a paging process, that the location information of the terminal device needs to be reported.

FIG. 6 may not include a process in which the serving base station requests the context of the terminal device from the camping gNB. In other words, the solution shown in FIG. 6 may not include steps S205 and S206. In addition, the second reply message in step S207 may not carry the information used to instruct the terminal device to enter the RRC connected state. In this case, the second reply message carries the information used to instruct the terminal device to continue to stay in the RRC inactive state. In this way, after receiving the second reply message, the terminal device continues to stay in the RRC inactive state.

FIG. 6 may not include a process in which the serving base station requests path switch from the AMF. In other words, the solution shown in FIG. 6 may not include steps S208 and S209. In addition, FIG. 6 may not include a process in which the serving base station requests the camping gNB to release the context of the terminal device. For example, the solution shown in FIG. 6 may not include steps S210 and S211.

In addition, in the solution shown in FIG. 6, the serving base station does not request path switch from the AMF. Therefore, the location report sent by the serving base station to the core network device further needs to carry second identification information of the terminal device, and the second identification information of the terminal device is used to identify the terminal device, so that the AMF can determine a terminal device to which the location report sent in step S212 is specific.

For example, the second identification information may be NAS identification information, for example, identification information such as an international mobile subscriber identity (international mobile subscriber identification number, IMSI) or a temporary mobile subscriber identity (temperate Mobile subscription identity, TMSI).

In conclusion, in the solution shown in FIG. 6, the second instruction information is carried in the paging message, so that the serving base station can determine, in the paging process, that the location information of the terminal device needs to be reported, and therefore the AMF can obtain the location information of the terminal device in advance. In addition, the process of obtaining the context of the terminal device may not be performed in the solution shown in FIG. 6, thereby reducing signaling overheads.

It should be noted that in the solutions shown in FIG. 5 and FIG. 6, the serving base station reports the location information of the terminal device to the AMF. In a process in which the AMF requests to report the location information of the terminal device, an AMF of the serving base station may change from an AMF (for example, a first AMF, to be specific, an AMF that needs to obtain the location information of the terminal device) same as that of the camping gNB to an AMF (for example, a second AMF) different from that of the camping base station due to a reason. Therefore, the serving base station may first send the location information of the terminal device to the second AMF, and then the second AMF sends the location information of the terminal device to the first AMF, so that the first AMF can obtain the location information of the terminal device in time. When the serving base station sends the location information of the terminal device to the second AMF, third instruction information may be further carried, and the third instruction information is used to instruct to send the location information of the terminal device to the first AMF. In addition, the serving base station also needs to first determine that the first AMF needs to obtain the location information of the terminal device.

Further, because the second instruction information is sent only to a base station (for example, the serving base station) that is in the RNA and that serves the terminal device at the current moment, compared with the solution that is shown in FIG. 6 and in which the second instruction information needs to be carried in the paging message sent to all the base stations in the RNA, signaling overheads can be reduced in the solution shown in FIG. 5.

Figure 7:
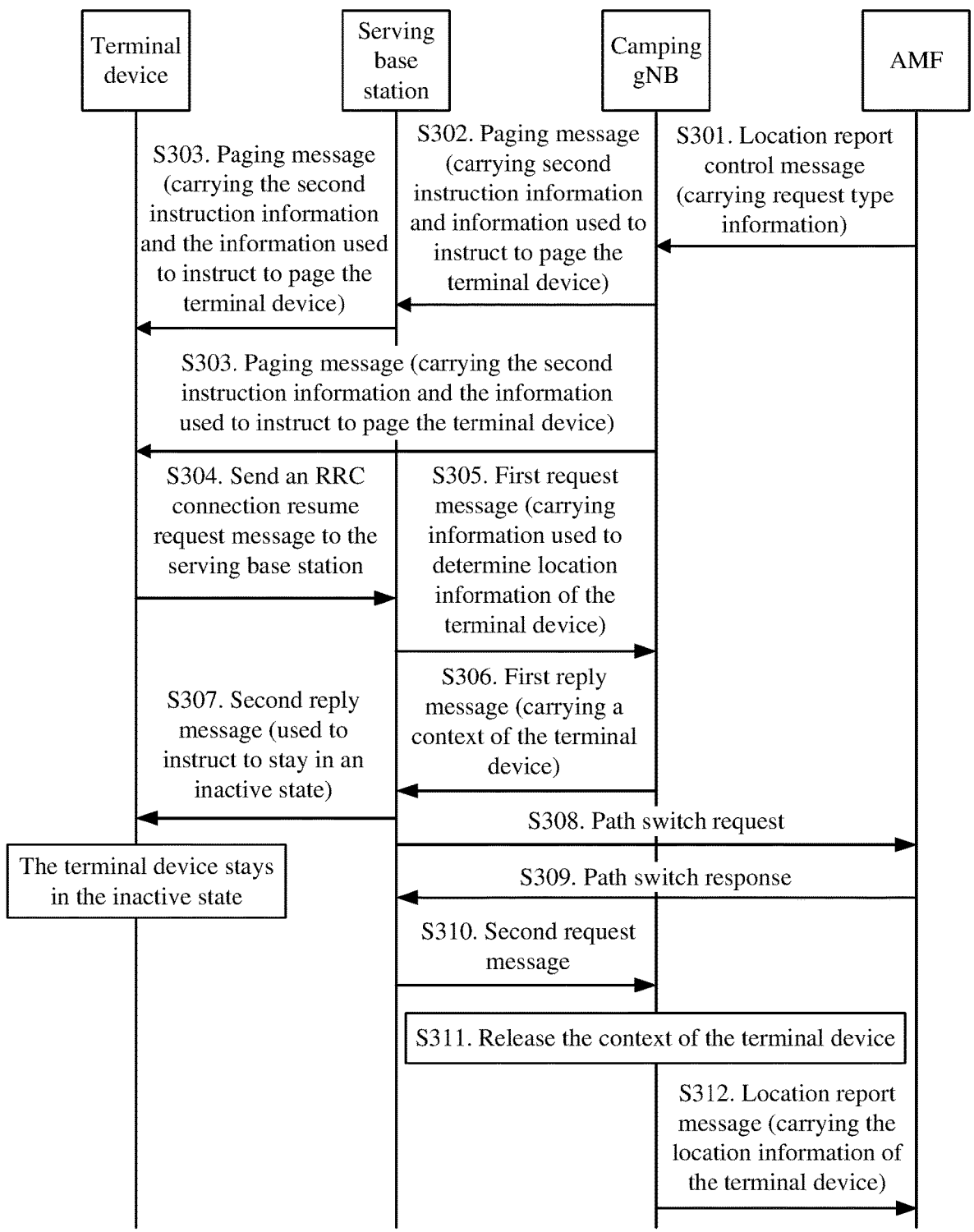
FIG. 7 is a schematic flowchart 6 of a location information reporting method according to an embodiment of the present invention.

An example in which the camping gNB reports the location information of the terminal device to the AMF and sends the second instruction information to the terminal device in a process in which all base stations in an RNA page the terminal device is used in the solution shown in FIG. 7. Therefore, the solution shown in FIG. 7 includes the following steps.

S301. The AMF sends a location report control (location reporting control) message to the camping gNB, where the location report control message includes request type information.

For specific content of the location report control message, refer to the foregoing embodiment. Details are not described herein again in this application.

S302a. The camping gNB receives the location report control message.

S302. The camping gNB sends a RAN paging message to a base station other than the camping gNB in the RNA, where the paging message carries a second identifier of the terminal device and the second instruction information.

Specifically, for content of the second instruction information, refer to the description in the foregoing embodiment. Details are not described herein again in this application.

Optionally, the RNA includes at least a camping gNB accessed when the terminal device is in an RRC connected state and a serving base station that provides a service for the terminal device at a current moment when the terminal device switches from the RRC connected state to an RRC inactive state.

It may be understood that at the current moment, the terminal device is outside an area of the camping gNB, and is within an area of the serving base station that provides the service for the terminal device.

For example, the second identifier may uniquely identify the terminal device in the RNA, for example, the second identifier may be a resume ID.

It may be understood that the first identifier may be the same as the second identifier.

S303. The camping gNB and the another base station (for example, a serving base station) that receives the paging message sent by the camping gNB send the paging message to the terminal device.

S304. After receiving the paging message, the terminal device sends a resume request message to the serving base station, where the resume request message may be used to request the terminal device to resume to a connected (connected) state.

S305. The serving base station sends a first request message to the camping gNB, where the first request message carries information used to obtain a context of the terminal device, information used to determine the location information of the terminal device, and first identification information of the terminal device.

For example, the first request message may be a request message used to obtain the context of the terminal device, the information used to determine the location information of the terminal device may include identification information of a cell in which the terminal device is currently located.

It should be noted that when the first request message is the request message used to obtain the context of the terminal device, the information used to determine the location information of the terminal device may further include a current tracking area identity (TAI) or a current registration area identity (RAI) of the terminal device.

For example, the identification information of the cell in which the terminal device is currently located may be a global identity of the cell in which the terminal device is currently located, a physical cell identifier (PCI) of the cell in which the terminal device is currently located, or an identifier in another form. This is not limited in this application.

S306. The camping gNB sends a first reply message for the first request message to the serving base station, where the first reply message carries context information of the terminal device.

Specifically, for the context information of the terminal device, refer to the foregoing embodiment. Details are not described herein again in this application.

S307. The serving base station sends a second reply message for the resume request message to the terminal device, where the second reply message carries information used to instruct the terminal device to keep a current state (or to continue to stay in the current state, in other words, keep an inactive state).

Optionally, the second reply message may include a fourth message, and the fourth message is used to instruct the terminal device to keep the current state.

For example, the fourth message may be an RRC connection reject message, an RRC connection suspend message, or an RRC connection release message. In addition, the terminal device keeps the current state after the terminal device receives the fourth message.

S308. The serving base station sends a path switch request to the AMF.

S309. The AMF sends a path switch response (path switch request Ack) to the serving base station.

It may be understood that after steps S308 and S309, the AMF can determine that a base station that serves the terminal device is the serving base station. To be specific, the AMF can subsequently communicate with the terminal device by using the serving base station.

S310. The serving base station sends a second request message to the camping gNB, where the second request message carries information used to instruct to release the context of the terminal device.

The second request message may be in a plurality of forms. For example, the second request message may be a message for releasing the context of the terminal device, another newly defined signaling message, or an existing signaling message. The existing signaling message carries the information used to instruct to release the context of the terminal device. This is not limited in this application.

S311. After the camping gNB receives the second request message, the camping gNB releases the context of the terminal device.

S312. The camping gNB sends a location report to the AMF, where the location report includes the location information of the terminal device.

S312a. The AMF receives the location report sent by the camping gNB.

In conclusion, a difference between the solution shown in FIG. 7 and the solution shown in FIG. 5 lies in that the camping gNB reports the location information of the terminal device to the AMF in FIG. 7. In a scenario in which the serving base station reports the location information of the terminal device, the serving base station usually reports the location information of the terminal device to an AMF of the serving base station, and the serving base station may change the AMF due to a reason in a process of obtaining the second instruction information. When a changed AMF is different from an AMF that needs to obtain the location information of the terminal device, if the serving base station continues to report the location information of the terminal device, the following problem occurs: The AMF that needs to obtain the location information of the terminal device cannot obtain the location information of the terminal device. Therefore, the foregoing problem can be avoided when the camping gNB reports the location information of the terminal device to the AMF. In addition, the camping gNB sends the second instruction information to the another base station in the RNA in a paging process, so that the AMF can obtain the location information of the terminal device in advance. Further, because path switch is performed, the AMF can communicate with the terminal device by using the serving base station in a subsequent process.

Figure 8:
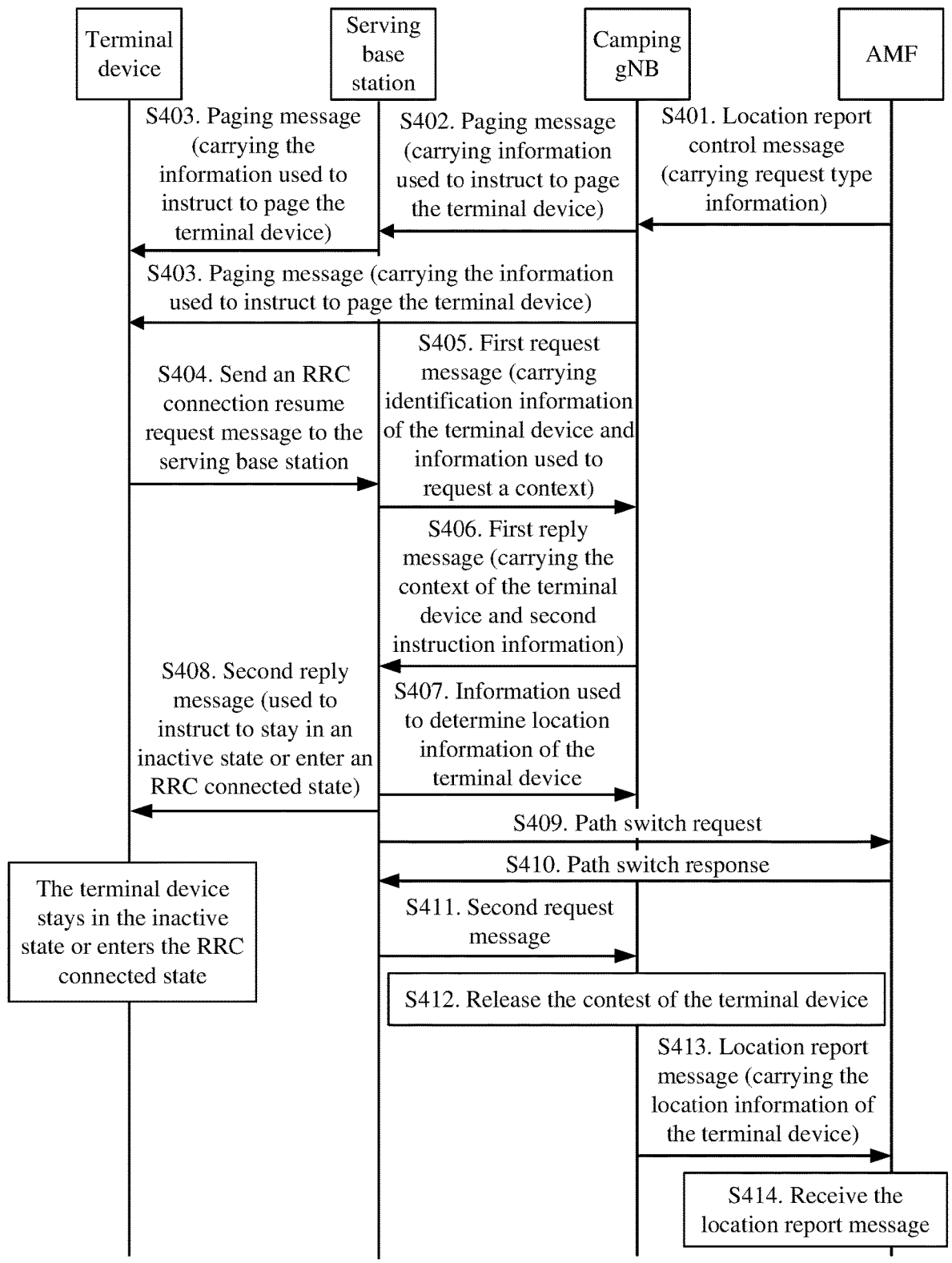
FIG. 8 is a schematic flowchart 7 of a location information reporting method according to an embodiment of the present invention.

Based on the solution shown in FIG. 7, an example in which the camping gNB reports the location information of the terminal device to the AMF and the camping gNB sends the second instruction information to the serving base station in a process in which the serving base station requests the context of the terminal device is used in the solution shown in FIG. 8. Specifically, the solution shown in FIG. 8 includes the following steps.

S401. The AMF sends a location report control message to the camping gNB, where the location report control message includes request type information.

For specific content of the location report control message, refer to the foregoing embodiment. Details are not described herein again in this application.

S402a. The camping gNB receives the location report control message.

S402. The camping gNB sends a paging message to a base station other than the camping gNB in an RNA, where the paging message carries a second identifier of the terminal device and information used to instruct to page the terminal device.

Optionally, the RNA includes at least a serving base station that provides a service for the terminal device at a current moment when the terminal device switches from an RRC connected state to an RRC inactive state.

It may be understood that at the current moment, the terminal device is outside an area of the camping gNB, and is within an area of the serving base station that provides the service for the terminal device.

For example, the second identifier may uniquely identify the terminal device in the RNA, for example, the second identifier may be a resume ID.

It may be understood that the first identifier may be the same as the second identifier.

S403. The camping gNB and the another base station (for example, the serving base station) that receives the paging message sent by the camping gNB send the paging message to the terminal device.

S404. After receiving the paging message, the terminal device sends a resume request message to the serving base station, where the resume request message is used to request the terminal device to resume to a connected state.

Specifically, for the resume request message, refer to the foregoing embodiment. Details are not described herein again in this application.

S405. The serving base station sends a first request message to the camping gNB, where the first request message carries first identification information of the terminal device and information used to obtain the context of the terminal device.

The first request message may be a request message used to obtain the context of the terminal device.

S406. The camping gNB sends a first reply message for the first request message to the serving base station, where the first reply message carries context information of the terminal device and the second instruction information.

Specifically, for content of the second instruction information and the context information of the terminal device, refer to the foregoing embodiment. Details are not described herein again in this application.

S407. The serving base station sends, to the camping gNB, information used to determine the location information of the terminal device.

Specifically, for the information used to determine the location information of the terminal device, refer to the description in the foregoing embodiment. Details are not described herein again in this application.

It should be noted that the information that is sent by the serving base station to the camping gNB and that is used to determine the location information of the terminal device may be sent in a fifth message. The fifth message may be a newly defined signaling message or an existing signaling message exchanged between the camping gNB and the serving base station after the camping gNB sends the first reply message for the first request message to the serving base station. The existing signaling message may carry the information used to determine the location information of the terminal device. This is not limited in this application.

S408. The serving base station sends a second reply message for the resume request message to the terminal device, where the second reply message carries information used to instruct the terminal device to enter an RRC connected state or information used to instruct the terminal device to keep a current state (or to continue to stay in the current state, in other words, keep an inactive state).

Optionally, the second reply message may include a third message or a fourth message. The third message is used to instruct the terminal device to enter the RRC connected state, and the fourth message is used to instruct the terminal device to keep the current state.

For example, the third message may be an RRC connection resume message, and the fourth message may be an RRC connection reject message, an RRC connection suspend message, or an RRC connection release message. In addition, the terminal device keeps the current state after the terminal device receives the fourth message.

S409. The serving base station sends a path switch request to the AMF.

S410. The AMF sends a path switch response (path switch request Ack) to the serving base station.

It may be understood that after steps S409 and S410, the AMF can determine that a camping gNB that serves the terminal device is the serving base station. To be specific, the AMF can subsequently communicate with the terminal device by using the serving base station.

S411. The serving base station sends a second request message to the camping gNB, where the second request message carries information used to instruct to release the context of the terminal device.

The second request message may be in a plurality of forms. For example, the second request message may be a message for releasing the context of the terminal device, another newly defined signaling message, or an existing signaling message. The existing signaling message carries the information used to instruct to release the context of the terminal device. This is not limited in this application.

S412. After the camping gNB receives the second request message, the camping gNB releases the context of the terminal device.

S413. The camping gNB sends a location report to the AMF, where the location report includes the location information of the terminal device.

S414. The AMF receives the location report sent by the camping gNB.

Figure 9A:
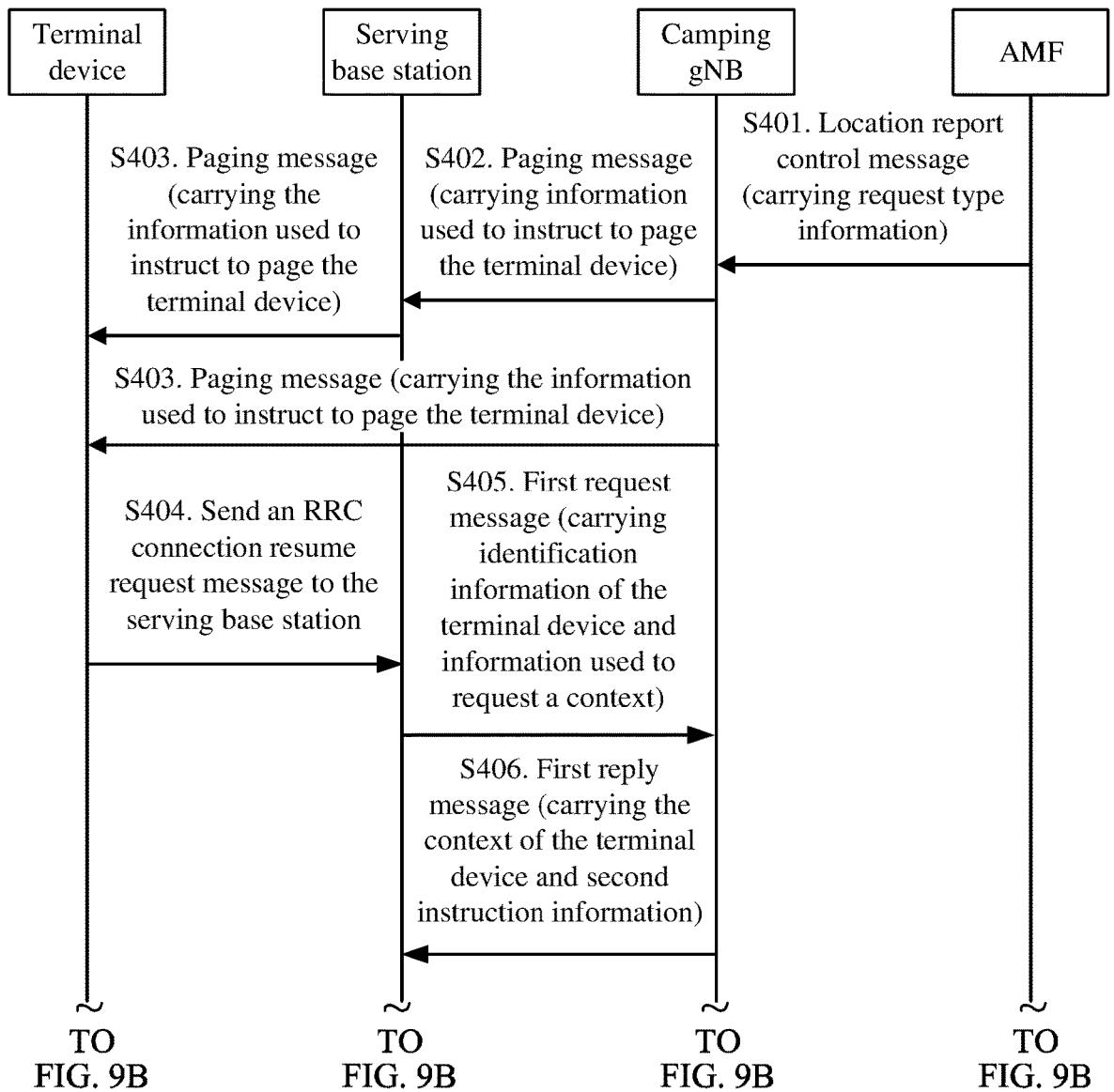
FIG. 9A and FIG. 9B are a schematic flowchart 8 of a location information reporting method according to an embodiment of the present invention.
Figure 9B:
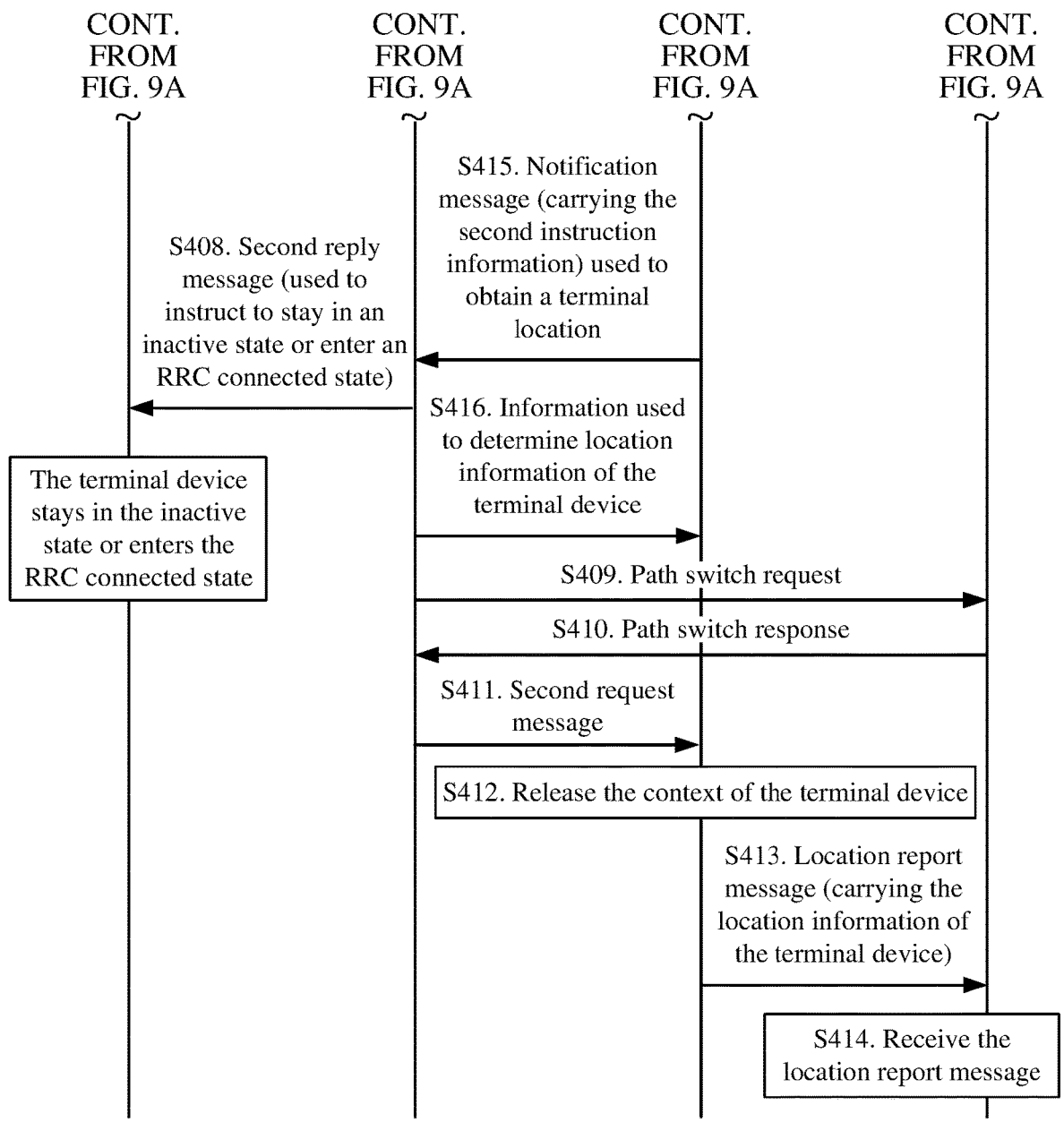

Based on the solution shown in FIG. 8, this application provides a location information reporting method for the scenario 3. A difference between the solution shown in FIG. 9A and FIG. 9B and the solution shown in FIG. 8 lies in that in FIG. 8, the camping gNB adds the second instruction information to the first reply message in step S406, namely, in the process in which the serving base station requests the context of the terminal device from the camping gNB, and in the solution shown in FIG. 9A and FIG. 9B, after the process in which the serving base station requests the context of terminal device from the camping gNB, the camping gNB sends a notification message used to obtain a terminal location to the serving base station. In step S415 shown in FIG. 9B, the notification message used to obtain the terminal location is used to report the location information of the terminal device. Optionally, the notification message used to obtain the terminal location carries the second instruction information. In addition, the serving base station may send, based on the notification message used to obtain the terminal location, a response message used to obtain the terminal location to the camping gNB. The response message used to obtain the terminal location carries the location information of the terminal device. The camping gNB can determine the location information of the terminal device based on the response message used to obtain the terminal location.

It should be noted that after the process in which the serving base station requests the context from the camping gNB, the camping gNB in this application can send a message used to obtain the location information of the terminal to the serving base station. The serving base station can report the location information of the terminal device to the camping gNB based on the message used to obtain the location information of the terminal.

Figure 10:
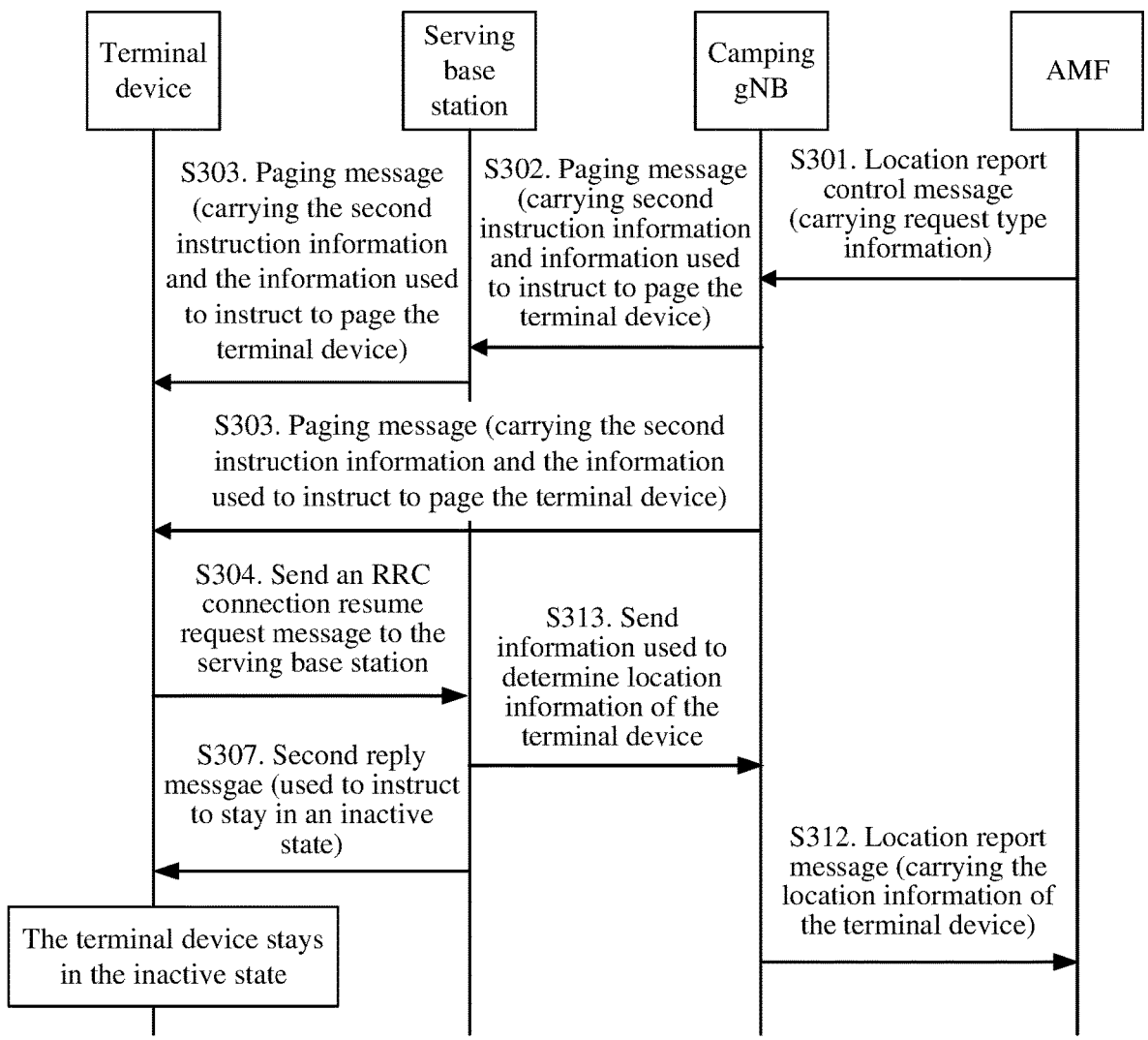
FIG. 10 is a schematic flowchart 9 of a location information reporting method according to an embodiment of the present invention.

Based on the solution shown in FIG. 7, an example in which the camping gNB reports the location information of the terminal device to the AMF and the camping gNB sends the second instruction information in a process in which all base stations in an RNA page the terminal device is used in the solution shown in FIG. 10. Difference between the solution shown in FIG. 10 and the solution shown in FIG. 7 are as follows:

The process in which the serving base station requests the context of the terminal device from the camping gNB may not be performed in FIG. 10, in other words, steps S305 and S306 are not included, and the following step is further included before step S307.

S313. The serving base station sends the information used to determine the location information of the terminal device to the camping gNB. In addition, in this case, the information used to determine the location information of the terminal device may be a request message used to obtain the context of the terminal device. In this case, the information used to determine the location information of the terminal device may carry TAI information. Alternatively, the information used to determine the location information of the terminal device may be a newly defined signaling message. In this case, the information used to determine the location information of the terminal device may carry TAI information and identification information of a cell in which the terminal device is currently located. Further, compared with the solution shown in FIG. 7, the solution shown in FIG. 10 may not include a process in which the serving base station requests path switch from the camping gNB, for example, steps S308, S309, S310, and S311 in FIG. 7.

Figure 11:
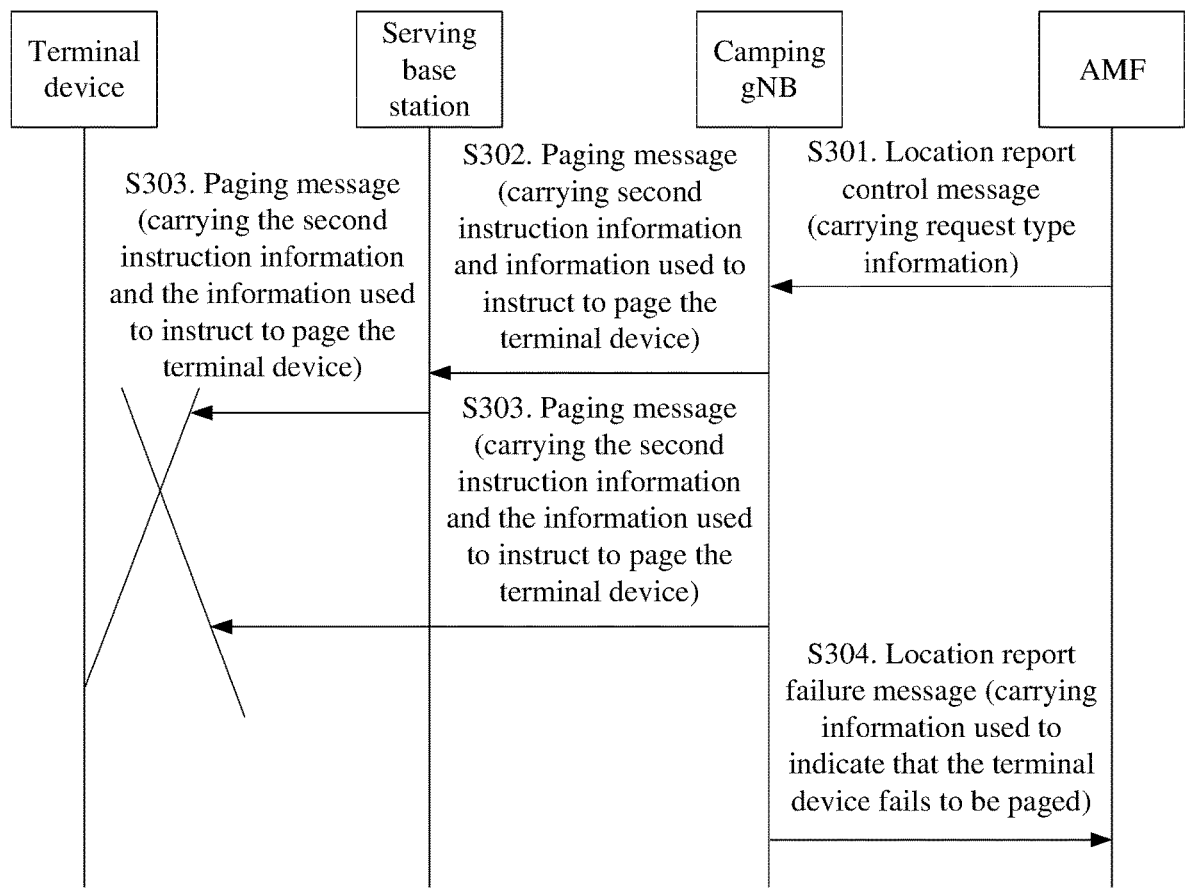
FIG. 11 is a schematic flowchart 10 of a location information reporting method according to an embodiment of the present invention.

FIG. 11 shows a specific embodiment of another location information reporting method in this application. The solution shown in FIG. 11 includes a process in which the AMF sends a location report control message and a process in which all base stations in an RNA page the terminal device. For details, refer to steps S301, S302, and S303. After step S303, steps S304 to S312 in the solution shown in FIG. 7 are replaced with step S314.

It should be noted that the paging message in steps S302 and S303 may alternatively include information used to instruct to page the terminal device, but does not include the second instruction information.

S314. If the camping gNB determines that the terminal device cannot be paged, the camping gNB sends a location report failure message to the AMF, where the location report failure message carries information used to indicate that the terminal device fails to be paged.

In addition, after receiving the location report failure message, the AMF can initiate a paging procedure on a core network (CN) side based on the information used to indicate that the terminal device fails to be paged. It should be noted that when the first cause value in the foregoing embodiment indicates that the terminal device is outside a coverage area of the camping gNB, the AMF does not re-initiate paging procedure on the CN side, but waits for the base station to send the location information of the terminal device, or does not perform anything if the AMF has received the location information of the terminal device by using the serving base station.

For example, the information used to indicate that the terminal device fails to be paged may be a second cause value.

The solutions provided in the embodiments of this application are mainly described above from a perspective of interaction between network elements. It may be understood that to implement the foregoing functions, the network elements such as the first base station, the second base station, and the core network device include corresponding hardware structures and/or software modules for performing the functions. A person skilled in the art should be easily aware that units and algorithms steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first base station, the second base station, and the core network device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, module division is an example, and is merely logical function division. There may be another division manner during actual implementation. An example in which each function module is obtained through division based on each corresponding function is used for description below.

Figure 12:
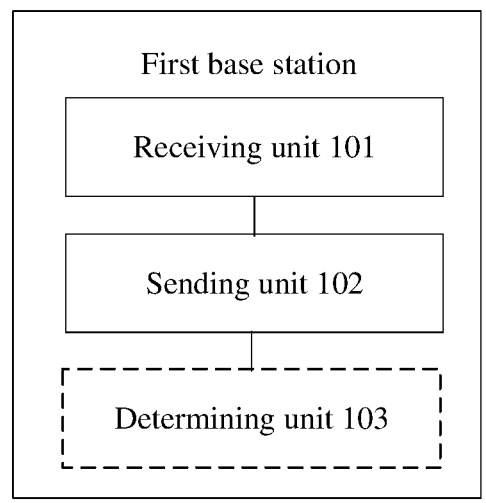
FIG. 12 is a schematic structural diagram 1 of a first base station according to an embodiment of the present invention.

When an integrated unit is used, FIG. 12 is a possible schematic structural diagram of the first base station in the foregoing embodiments. The first base station includes a receiving unit 101 and a sending unit 102. The receiving unit 101 is configured to support the first base station in performing steps S102, S108, S202a, S302a, S311, S402a, and S412 in the foregoing embodiments. The sending unit 102 is configured to support the first base station in performing steps S103, S105, S110, S111, S202, S203, S206, S213, S302, S303, S306, S312, S402, S403, S406, S413, S414, and S415 in the foregoing embodiments. In addition, the first base station further includes a determining unit 103, and the determining unit 103 is configured to support the first base station in performing step S109 in the foregoing embodiment. All related content of the steps in the foregoing method embodiments can be cited in function descriptions of corresponding function modules. Details are not described herein again.

Based on hardware implementation, the sending unit 102 in this application may be a transmitter of the first base station, and the receiving unit 101 may be a receiver of the first base station. The transmitter and the receiver may be usually integrated together to form a transceiver. Specifically, the transceiver may also be referred to as a communications interface or a transceiver circuit. The determining unit 103 may be integrated into a processor of the first base station.

Figure 13:
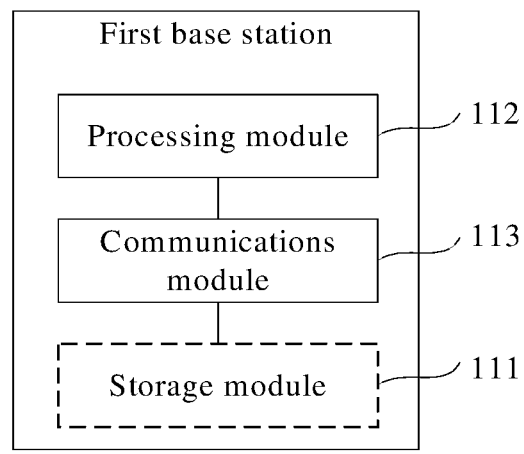
FIG. 13 is a schematic structural diagram 2 of a first base station according to an embodiment of the present invention.

When an integrated unit is used, FIG. 13 is a schematic diagram of a possible logical structure of the first base station in the foregoing embodiments. The first base station includes a processing module 112 and a communications module 113. The processing module 112 is configured to control and manage an action of the first base station. For example, the processing module 112 is configured to support the first base station in performing step S109 in the foregoing embodiment. The communications module 113 is configured to support the first base station in performing steps S102, S108, S202a, S302a, S311, S402a, S412, S415, S103, S105, S110, S111, S202, S203, S206, S213, S302, S303, S306, S312, S402, S403, S406, S413, and S414 in the foregoing embodiments, and/or is configured to perform another process performed by the first base station in the technology described in this specification. Optionally, the first base station may further include a storage module in, configured to store program code and data that are of the first base station.

The processing module 112 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in the present invention. Alternatively, the processor may be a combination of processors implementing a computing function, for example, a combination of one or more microprocessors or a combination of a digital signal processor and a microprocessor. The communications module 113 may be a transceiver, a transceiver circuit, a communications interface, or the like. The storage module 111 may be a memory.

Figure 14:
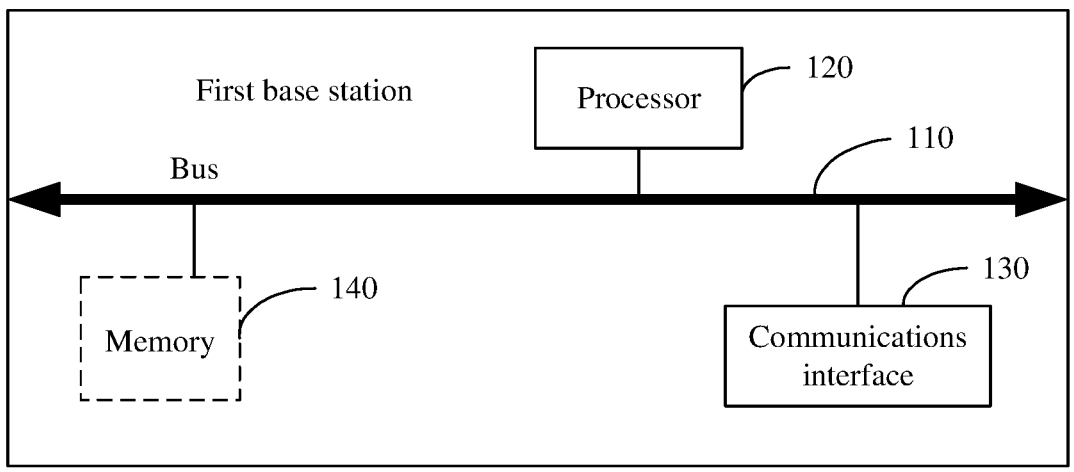
FIG. 14 is a schematic structural diagram 3 of a first base station according to an embodiment of the present invention.

When the processing module 112 is a processor 120, the communications module 113 is a communications interface 130 or a transceiver, and the storage module 111 is a memory 140, the first base station in this application may be a device shown in FIG. 14.

The communications interface 130, at least one processor 120, and the memory 140 are connected to each other by using a bus 110. The bus 110 may be a PCI bus, an EISA bus, or the like. The bus may be classified into an address bus, a data bus, a control bus, and the like. For ease of representation, only one thick line is used to represent the bus 110 in FIG. 14, but this does not mean that there is only one bus or only one type of bus. The memory 140 is configured to store program code and data that are of the first base station. The communications interface 130 is configured to support the first base station in communicating with another device (for example, a core network device). The processor 120 is configured to support the first base station in executing the program code and the data that are stored in the memory 140, to implement the location information reporting method provided in this application.

Figure 15:
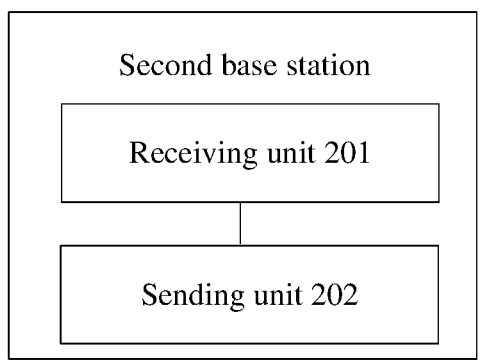
FIG. 15 is a schematic structural diagram 1 of a second base station according to an embodiment of the present invention.

When an integrated unit is used, FIG. 15 is a possible schematic structural diagram of the second base station in the foregoing embodiments. The second base station includes a receiving unit 201 and a sending unit 202. The receiving unit 201 is configured to support the second base station in performing step S104a in the foregoing embodiment. The sending unit 202 is configured to support the second base station in performing steps S104, S106, S107, S205, S207, S208, S210, S212, S305, S307, S308, S310, S405, S407, S408, S409, S411, S413, and S416 in the foregoing embodiments, and/or is configured to perform another process in the technology described in this specification. All related content of the steps in the foregoing method embodiments can be cited in function descriptions of corresponding function modules. Details are not described herein again.

Based on hardware implementation, the receiving unit 201 in this application may be a receiver of the second base station, and the sending unit 202 may be a transmitter of the second base station. The receiver and the transmitter of the second base station may be usually integrated together to form a transceiver. Specifically, the transceiver may also be referred to as a communications interface or a transceiver circuit.

Figure 16:
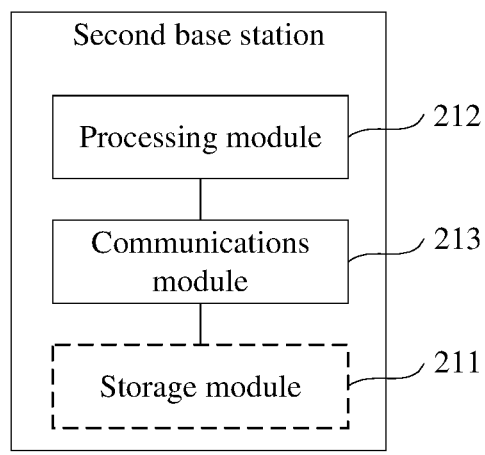
FIG. 16 is a schematic structural diagram 2 of a second base station according to an embodiment of the present invention.

When an integrated unit is used, FIG. 16 is a schematic diagram of a possible logical structure of the second base station in the foregoing embodiment. The second base station includes a processing module 212 and a communications module 213. The processing module 212 is configured to control and manage an action of the second base station. For example, the processing module 212 is configured to support the second base station in processing a message or data on the second base station side in the foregoing embodiments. The communications module 213 is configured to support the second base station in performing steps S104a, S104, S106, S107, S205, S207, S208, S210, S212, S305, S307, S308, S310, S405, S407, S408, S409, S411, S413, and S416 in the foregoing embodiments, and/or is configured to perform another process performed by the second base station in the technology described in this specification.

Optionally, the second base station may further include a storage module 211, configured to store program code and data that are of the second base station.

The processing module 212 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 212 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 213 may be a transceiver, a transceiver circuit, a communications interface, or the like. The storage module 211 may be a memory.

Figure 17:
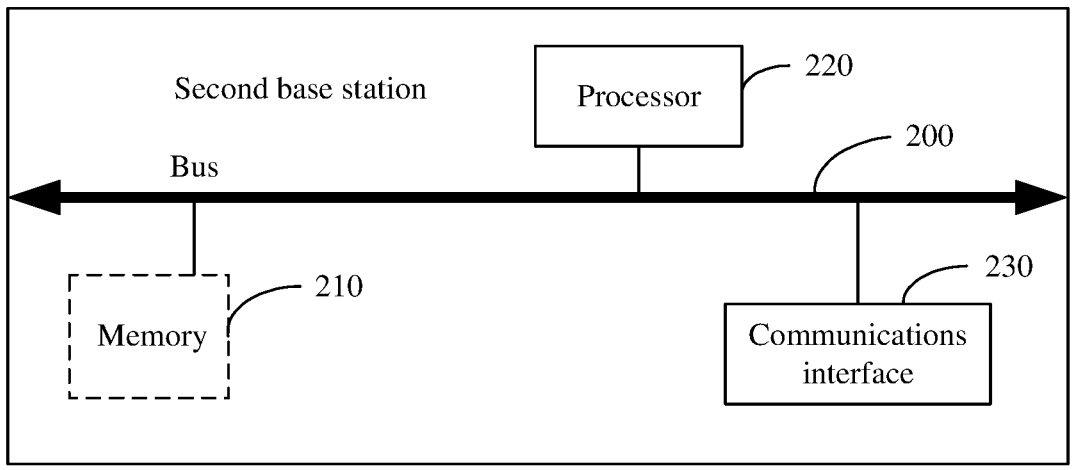
FIG. 17 is a schematic structural diagram 3 of a second base station according to an embodiment of the present invention.

When the processing module 212 is a processor 220, the communications module 213 is a communications interface 230 or a transceiver, and the storage module 211 is a memory 210, the second base station in this application may be a device shown in FIG. 17.

The communications interface 230, at least one processor 220, and the memory 210 are connected to each other by using a bus 200. The bus 200 may be a PCI bus, an EISA bus, or the like. The bus may be classified into an address bus, a data bus, a control bus, and the like. For ease of representation, only one thick line is used to represent the bus 220 in FIG. 17, but this does not mean that there is only one bus or only one type of bus. The memory 210 is configured to store program code and data that are of the second base station. The communications interface 23o is configured to support the second base station in communicating with another device (for example, a first base station). The processor 220 is configured to support the second base station in executing the program code and the data that are stored in the memory 210, to implement the location information reporting method provided in this application.

Figure 18:
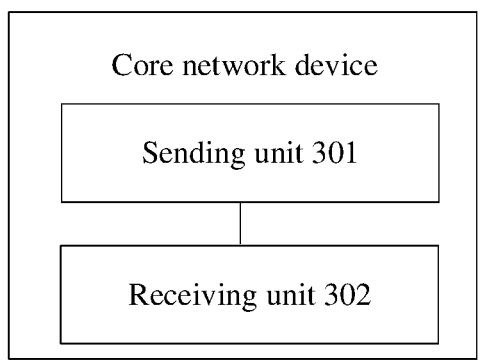
FIG. 18 is a schematic structural diagram 1 of a core network device according to an embodiment of the present invention.

When an integrated unit is used, FIG. 18 is a possible schematic structural diagram of the core network device in the foregoing embodiments. The core network device includes a sending unit 301 and a receiving unit 302. The sending unit 301 is configured to support the core network device in performing steps S101, S201, S209, S301, S309, S401, and S410 in the foregoing embodiments. The receiving unit 302 is configured to support the core network device in performing steps S105a, S110a, S111a, S212a, S213a, S312a, and S414 in the foregoing embodiments, and/or is configured to perform another process in the technology described in this specification. All related content of the steps in the foregoing method embodiments can be cited in function descriptions of corresponding function modules. Details are not described herein again.

Based on hardware implementation, the receiving unit 302 in this application may be a receiver of the core network device, and the sending unit 301 may be a transmitter of the core network device. The receiver and the transmitter of the core network device may be usually integrated together to form a transceiver. Specifically, the transceiver may also be referred to as a communications interface or a transceiver circuit.

Figure 19:
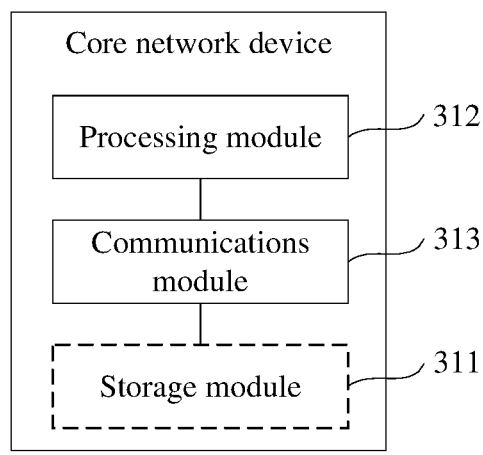
FIG. 19 is a schematic structural diagram 2 of a core network device according to an embodiment of the present invention.

When an integrated unit is used, FIG. 19 is a schematic diagram of a possible logical structure of the core network device in the foregoing embodiments. The core network device includes a processing module 312 and a communications module 313. The processing module 312 is configured to control and manage an action of the core network device. For example, the processing module 312 is configured to support the core network device in processing a message or data on the core network device side in the foregoing embodiment. The communications module 313 is configured to support the core network device in performing steps S101, S201, S209, S301, S309, S401, S410, S105a, S110a, S111a, S212a, S213a, S312a, and S414 in the foregoing embodiments, and/or is configured to perform another process performed by the core network device in the technology described in this specification.

Optionally, the core network device may further include a storage module 311, configured to store program code and data that are of the core network device.

The processing module 312 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 312 may implement or execute various example logical blocks, modules, and circuits described with reference to content disclosed in the present invention. Alternatively, the processor may be a combination of processors implementing a computing function, for example, a combination of one or more microprocessors or a combination of a digital signal processor and a microprocessor. The communications module 313 may be a transceiver, a transceiver circuit, a communications interface, or the like. The storage module 311 may be a memory.

Figure 20:
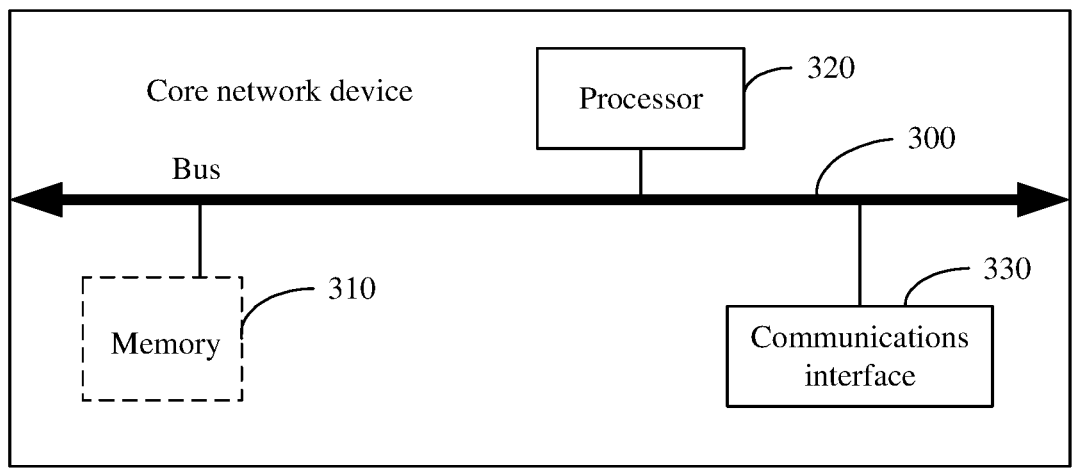
FIG. 20 is a schematic structural diagram 3 of a core network device according to an embodiment of the present invention.

When the processing module 312 is a processor 320, the communications module 313 is a communications interface 330 or a transceiver, and the storage module 311 is a memory 310, the core network device in this application may be a device shown in FIG. 20.

The communications interface 330, at least one processor 320, and the memory 310 are connected to each other by using a bus 300. The bus 300 may be a PCI bus, an EISA bus, or the like. The bus may be classified into an address bus, a data bus, a control bus, and the like. For ease of representation, only one thick line is used to represent the bus 330 in FIG. 20, but this does not mean that there is only one bus or only one type of bus. The memory 310 is configured to store program code and data that are of the core network device. The communications interface 330 is configured to support the core network device in communicating with another device (for example, a first base station). The processor 320 is configured to support the core network device in executing the program code and the data that are stored in the memory 310, to implement the location information reporting method provided in this application.

Figure 21:
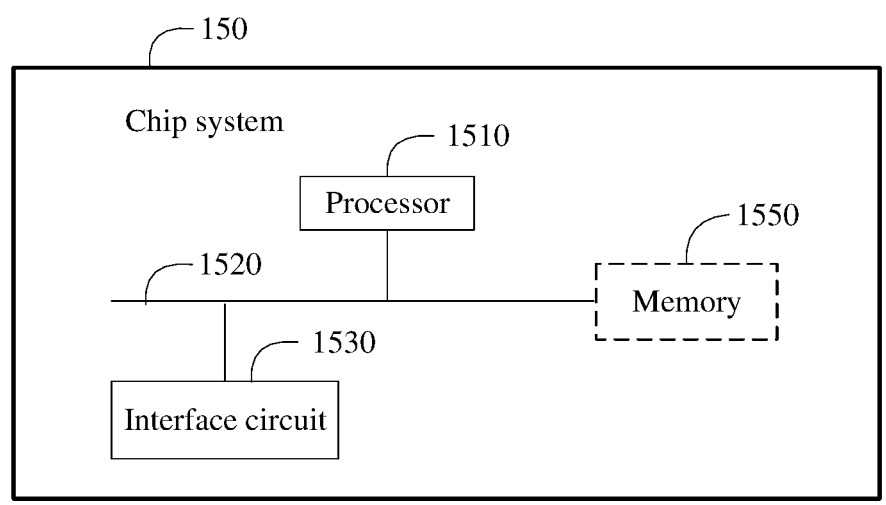
FIG. 21 is a schematic structural diagram of a chip system according to an embodiment of the present invention.

FIG. 21 is a schematic structural diagram of a chip system 150 according to an embodiment of the present invention. The chip system 150 includes at least one processor 1510 and an interface circuit 1530.

Optionally, the chip system 150 further includes a memory 1550. The memory 1550 may include a read-only memory and a random access memory, and provide an operation instruction and data for the processor 1510. A part of the memory 1550 may further include a non-volatile random access memory (NVRAM).

In some implementations, the memory 1550 stores the following elements: an executable module or a data structure, or a subset thereof, or an extended set thereof.

In this embodiment of the present invention, the processor 1510 performs a corresponding operation by invoking the operation instruction (the operation instruction may be stored in an operating system) stored in the memory 1550.

In a possible implementation, structures of chip systems used by a first base station, a core network device, and a second base station are similar, but different apparatuses may use different chip systems to implement respective functions.

The processor 1510 controls operations of the first base station, the core network device, and the second base station, and the processor 1510 may also be referred to as a CPU (Central Processing Unit). The memory 1550 may include a read-only memory and a random access memory, and provide an instruction and data for the processor 1510. A part of the memory 1550 may further include a non-volatile random access memory (NVRAM). In specific application, the processor 1510, the interface circuit 1530, and the memory 1550 are coupled together by using a bus system 1520. The bus system 1520 may include a power bus, a control bus, a status signal bus, and the like in addition to a data bus. However, for clear description, various buses are marked as the bus system 1520 in FIG. 21.

The method disclosed in the foregoing embodiment of the present invention may be applied to the processor 1510, or implemented by the processor 1510. The processor 1510 may be an integrated circuit chip and has a signal processing capability. In an implementation process, the steps in the foregoing methods may be completed by using a hardware integrated logical circuit in the processor 1510 or an instruction in a form of software. The processor 1510 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 1510 may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly performed and completed by a hardware decoding processor, or may be performed and completed by a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1550. The processor 1510 reads information from the memory 1550, and completes the steps in the foregoing methods in combination with hardware of the processor 1510.

Optionally, the interface circuit 1530 is configured to perform receiving and sending steps of the first base station, the core network device, and the second base station in the embodiments shown in FIG. 2, FIG. 3, FIG. 4, FIG. 5, FIG. 6, FIG. 7, FIG. 8, FIG. 9A and FIG. 9B, FIG. 10, and FIG. 11.

Optionally, the processor 1510 is configured to perform processing steps of the first base station, the core network device, and the second base station in the embodiments shown in FIG. 2, FIG. 3, FIG. 4, FIG. 5, FIG. 6, FIG. 7, FIG. 8, FIG. 9A and FIG. 9B, FIG. 10, and FIG. 11.

In the foregoing embodiment, the instruction stored in the memory for execution by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk, SSD), or the like.

According to one aspect, a computer storage medium is provided. The computer readable storage medium stores an instruction. When the instruction is run, a first base station is enabled to perform steps S109, S102, S108, S202a, S302a, S311, S402a, S412, S103, S105, S110, S111, S202, S203, S206, S213, S302, S303, S306, S312, S402, S403, S406, S413, S414, and S415 in the embodiments, and/or to perform another process performed by the first base station in the technology described in this specification.

According to another aspect, a computer storage medium is provided. The computer readable storage medium stores an instruction. When the instruction is run, a core network device is enabled to perform steps S101, S201, S209, S301, S309, S401, S410, S105a, S110a, S111a, S212a, S213a, S312a, and S414 in the embodiments, and/or to perform another process performed by the core network device in the technology described in this specification.

According to still another aspect, a computer storage medium is provided. The computer readable storage medium stores an instruction. When the instruction is run, a second base station is enabled to perform steps S104a, S104, S106, S107, S205, S207, S208, S210, S212, S305, S307, S308, S310, S405, S407, S408, S409, S411, S413, and S416 in the embodiments, and/or to perform another process performed by the second base station in the technology described in this specification.

According to one aspect, a computer program product including an instruction is provided. The computer program product stores the instruction. When the instruction is run, a first base station is enabled to perform steps S109, S102, S108, S202a, S302a, S311, S402a, S412, S103, S105, S110, S111, S202, S203, S206, S213, S302, S303, S306, S312, S402, S403, S406, S413, S414, and S415 in the embodiments, and/or to perform another process performed by the first base station in the technology described in this specification.

According to another aspect, a computer program product including an instruction is provided. The computer program product stores the instruction. When the instruction is run, a second base station is enabled to perform steps S104a, S104, S106, S107, S205, S207, S208, S210, S212, S305, S307, S308, S310, S405, S407, S408, S409, S411, S413, and S416 in the embodiments, and/or to perform another process performed by the second base station in the technology described in this specification.

According to still another aspect, a computer program product including an instruction is provided. The computer program product stores the instruction. When the instruction is run, a core network device is enabled to perform steps S101, S201, S209, S301, S309, S401, S410, S105a, S110a, S111a, S212a, S213a, S312a, and S414 in the embodiments, and/or to perform another process performed by the core network device in the technology described in this specification.

In addition, this application further provides a communications system, and the communications system includes the first base station shown in FIG. 12 to FIG. 14, the second base station shown in FIG. 15 to FIG. 17, and the core network device shown in FIG. 18 to FIG. 20.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by a first base station, a first message sent by a core network device, wherein the first message comprises first instruction information that instructs to report location information of a terminal device, and the first base station and the core network device have a control plane connection established for the terminal device when the first message is received; and
sending, by the first base station, a second message to a second base station, wherein the second message comprises second instruction information, the second instruction information instructs to report the location information of the terminal device, and the second base station is configured to provide a service for the terminal device when the second message is sent, wherein the second message is a reply message sent by the first base station that corresponds to a message used to obtain a context of the terminal device, and wherein the message used to obtain the context of the terminal device is sent by the second base station.

2. The method according to claim 1, wherein the second instruction information comprises the first instruction information or a first instruction, and the first instruction is generated based on the first instruction information.

3. The method according to claim 2, wherein the first instruction information is request type information, and the request type information indicates a form of reporting the location information of the terminal device.

4. The method according to claim 1, further comprising:
sending, by the first base station, a third message to the core network device, wherein the third message carries information indicating that the terminal device is outside a coverage area of the first base station.

5. The method according to of claim 1, further comprising:
receiving, by the first base station, a fourth message sent by the second base station, wherein the fourth message carries the location information of the terminal device;
determining, by the first base station, the location information of the terminal device based on the fourth message; and
sending the location information of the terminal device to the core network device.

6. An apparatus, applied to a first base station, comprising:
a non-transitory computer-readable memory comprising computer-executable instructions; and
at least one processor coupled with the non-transitory computer-readable memory, wherein the at least one processor is configured to execute the instructions to:
receive a first message from a core network device, wherein the first message comprises first instruction information that instructs to report location information of a terminal device, and the first base station and the core network device have a control plane connection established for the terminal device when the first message is received; and
send a second message to a second base station, wherein the second message comprises second instruction information, the second instruction information instructs to report the location information of the terminal device, and the second base station is configured to provide a service for the terminal device when the second message is sent, wherein the second message is a reply message sent by the first base station that corresponds to a message used to obtain a context of the terminal device, and wherein the message used to obtain the context of the terminal device is sent by the second base station.

7. The apparatus according to claim 6, wherein the second instruction information comprises the first instruction information or a first instruction, wherein the first instruction is generated based on the first instruction information.

8. The apparatus according to claim 7, wherein the first instruction information is request type information, and the request type information indicates a form of reporting the location information of the terminal device.

9. The apparatus according to claim 5, wherein the at least one processor is further configured to execute the instructions to:
send a third message to the core network device, wherein the third message carries information indicating that the terminal device is outside a coverage area of the first base station.

10. The apparatus according to of claim 6, wherein the at least one processor is further configured to execute the instructions to:
receive a fourth message sent by the second base station, wherein the fourth message carries the location information of the terminal device;
determine the location information of the terminal device based on the fourth message; and
send the location information of the terminal device to the core network device.

11. A non-transitory computer-readable memory storing a program that is executable by at least one processor, the program including instructions that, when executed, cause a first base station to:
receive a first message from a core network device, wherein the first message comprises first instruction information that instructs to report location information of a terminal device, and the first base station and the core network device have a control plane connection established for the terminal device when the first message is received; and
send a second message to a second base station, wherein the second message comprises second instruction information, the second instruction information instructs to report the location information of the terminal device, and the second base station is configured to provide a service for the terminal device when the second message is sent, wherein the second message is a reply message sent by the first base station that corresponds a message used to obtain a context of the terminal device, and wherein the message used to obtain the context of the terminal device is sent by the second base station.

12. The non-transitory computer-readable memory according to claim 11, wherein the second instruction information comprises the first instruction information or a first instruction, wherein the first instruction is generated based on the first instruction information.

13. The non-transitory computer-readable memory according to claim 12, wherein the first instruction information is request type information, and the request type information indicates a form of reporting the location information of the terminal device.

14. The non-transitory computer-readable memory according to claim 11, wherein the program further includes instructions that, when executed, cause the first base station to:
send a third message to the core network device, wherein the third message carries information indicating that the terminal device is outside a coverage area of the first base station.

15. The non-transitory computer-readable memory according to of claim 11, wherein the program further includes instructions that, when executed, cause the first base station to:
receive a fourth message sent by the second base station, wherein the fourth message carries the location information of the terminal device;
determine the location information of the terminal device based on the fourth message; and
send the location information of the terminal device to the core network device.

16. A system, comprising:
a first base station;
a second base station; and
a core network device;
wherein the first base station is configured to:
- receive a first message from the core network device, wherein the first message comprises first instruction information that instructs to report location information of a terminal device, and the first base station and the core network device have a control plane connection established for the terminal device when the first message is received; and
- send a second message to the second base station, wherein the second message comprises second instruction information, the second instruction information instructs to report the location information of the terminal device, wherein the second message is a reply message sent by the first base station that corresponds a message used to obtain a context of the terminal device, and wherein the message used to obtain the context of the terminal device is sent by the second base station.

17. The system according to claim 16, wherein the second instruction information comprises the first instruction information or a first instruction, wherein the first instruction is generated based on the first instruction information.

18. The system according to claim 17, wherein the first instruction information is request type information, and the request type information indicates a form of reporting the location information of the terminal device.

19. The system according to claim 16, wherein the first base station is further configured to:
- send a third message to the core network device, wherein the third message carries information indicating that the terminal device is outside a coverage area of the first base station.

20. The system according to of claim 16, wherein the first base station is configured to:
- receive a fourth message sent by the second base station, wherein the fourth message carries the location information of the terminal device;
- determine the location information of the terminal device based on the fourth message; and
- send the location information of the terminal device to the core network device.

* * * * *

UNITED STATES PATENT AND TRADEMARK OFFICE
CERTIFICATE OF CORRECTION

PATENT NO. : 11,463,981 B2
APPLICATION NO. : 16/878234
DATED : October 4, 2022
INVENTOR(S) : Yinghao Jin Page 1 of 1

It is certified that error appears in the above-identified patent and that said Letters Patent is hereby corrected as shown below:

In the Claims

Claim 9, Column 39; Line 65; delete "claim 5" and insert --claim 6--.

Signed and Sealed this
Eighth Day of November, 2022

Katherine Kelly Vidal
*Director of the United States Patent and Trademark Office*